United States Patent
Schiffmann et al.

(10) Patent No.: US 11,989,168 B2
(45) Date of Patent: *May 21, 2024

(54) ENUMERATION OF ROOTED PARTIAL SUBTREES

(71) Applicant: Lower48 IP LLC, Dallas, TX (US)

(72) Inventors: Karl Schiffmann, Santa Barbara, CA (US); Jack J. LeTourneau, Ventura, CA (US); Mark Andrews, Pleasant Hills, CA (US)

(73) Assignee: Lower48 IP LLC, Dallas, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/182,425

(22) Filed: Mar. 13, 2023

(65) Prior Publication Data

US 2023/0229647 A1 Jul. 20, 2023

Related U.S. Application Data

(63) Continuation of application No. 17/590,229, filed on Feb. 1, 2022, now Pat. No. 11,636,079, which is a continuation of application No. 15/464,205, filed on Mar. 20, 2017, now Pat. No. 11,281,646, which is a continuation of application No. 15/081,612, filed on Mar. 25, 2016, now Pat. No. 9,646,034, which is a continuation of application No. 13/632,581, filed on Oct. 1, 2012, now Pat. No. 9,330,128, which is a continuation of application No. 11/319,758, filed on Dec. 27, 2005, now Pat. No. 8,316,059.

(60) Provisional application No. 60/640,427, filed on Dec. 30, 2004.

(51) Int. Cl.
*G06F 16/00* (2019.01)
*G06F 16/22* (2019.01)
*G06F 16/2455* (2019.01)
*G06F 16/901* (2019.01)

(52) U.S. Cl.
CPC ...... *G06F 16/2246* (2019.01); *G06F 16/2455* (2019.01); *G06F 16/9027* (2019.01)

(58) Field of Classification Search
None
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Cecil et al. |
| 4,001,951 A | 1/1977 | Fasse |
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |
| 4,677,550 A | 6/1987 | Ferguson |

(Continued)

FOREIGN PATENT DOCUMENTS

WO 2004012083 A2 2/2004

OTHER PUBLICATIONS

U.S. Pat. No. 7,386,541 ("Pal"), United States, Jun. 10, 2008.

(Continued)

*Primary Examiner* — Anhtai V Tran

(57) ABSTRACT

Embodiments of methods, apparatuses, devices and/or systems for manipulating hierarchical sets of data are disclosed. In particular, methods, apparatus devices and or/or systems for enumerating rooted partial subtrees are disclosed.

103 Claims, 17 Drawing Sheets

(56) References Cited

U.S. PATENT DOCUMENTS

| | | |
|---|---|---|
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,905,138 A | 2/1990 | Bourne |
| 4,916,655 A | 4/1990 | Ohsone et al. |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,010,478 A | 4/1991 | Deran |
| 5,021,943 A | 6/1991 | Grimes |
| 5,021,992 A | 6/1991 | Kondo |
| 5,050,071 A | 9/1991 | Harris et al. |
| 5,136,593 A | 8/1992 | Moon et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,325,531 A | 6/1994 | McKeeman et al. |
| 5,335,320 A | 8/1994 | Iwata et al. |
| 5,335,345 A | 8/1994 | Frieder et al. |
| 5,355,496 A | 10/1994 | Fant et al. |
| 5,450,581 A | 9/1995 | Bergen et al. |
| 5,463,777 A | 10/1995 | Bialkowski et al. |
| 5,493,504 A | 2/1996 | Minato |
| 5,493,678 A | 2/1996 | Arcuri et al. |
| 5,497,500 A | 3/1996 | Rogers et al. |
| 5,509,088 A | 4/1996 | Robson |
| 5,511,159 A | 4/1996 | Baker et al. |
| 5,519,627 A | 5/1996 | Mahmood et al. |
| 5,522,068 A | 5/1996 | Berkowitz |
| 5,544,301 A | 8/1996 | Orton et al. |
| 5,548,755 A | 8/1996 | Leung et al. |
| 5,577,253 A | 11/1996 | Blickstein |
| 5,590,319 A | 12/1996 | Cohen et al. |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,701,461 A | 12/1997 | Dalal et al. |
| 5,706,406 A | 1/1998 | Pollock |
| 5,724,512 A | 3/1998 | Winterbottom |
| 5,724,576 A | 3/1998 | Letourneau |
| 5,742,806 A | 4/1998 | Reiner et al. |
| 5,745,892 A | 4/1998 | Miyata et al. |
| 5,748,975 A | 5/1998 | LeTourneau |
| 5,758,152 A | 5/1998 | Letourneau |
| 5,778,354 A | 7/1998 | Leslie et al. |
| 5,778,371 A | 7/1998 | Fujihara |
| 5,781,906 A | 7/1998 | Aggarwal et al. |
| 5,784,557 A | 7/1998 | Oprescu |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui et al. |
| 5,838,319 A | 11/1998 | Guzak et al. |
| 5,848,159 A | 12/1998 | Collins et al. |
| 5,905,138 A | 5/1999 | Van Broekhoven |
| 5,930,805 A | 7/1999 | Marquis |
| 5,937,181 A | 8/1999 | Godefroid et al. |
| 5,940,619 A | 8/1999 | Abadi et al. |
| 5,960,425 A | 9/1999 | Buneman et al. |
| 5,970,490 A | 10/1999 | Morgenstern |
| 5,978,790 A | 11/1999 | Buneman et al. |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | Letourneau |
| 6,076,087 A | 6/2000 | Suciu |
| 6,088,691 A | 7/2000 | Bhargava et al. |
| 6,141,655 A | 10/2000 | Johnson et al. |
| 6,199,059 B1 | 3/2001 | Dahan et al. |
| 6,199,103 B1 | 3/2001 | Sakaguchi et al. |
| 6,236,410 B1 | 5/2001 | Politis et al. |
| 6,240,418 B1 | 5/2001 | Shadmon |
| 6,243,859 B1 | 6/2001 | Chen-Kuang |
| 6,272,495 B1 | 8/2001 | Hetherington |
| 6,279,007 B1 | 8/2001 | Uppala |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,377,953 B1 | 4/2002 | Gawlick et al. |
| 6,411,957 B1 | 6/2002 | Dijkstra |
| 6,438,540 B2 | 8/2002 | Nasr et al. |
| 6,442,584 B1 | 8/2002 | Kolli et al. |
| 6,446,256 B1 | 9/2002 | Hyman et al. |
| 6,466,240 B1 | 10/2002 | Maslov |
| 6,480,857 B1 | 11/2002 | Chandler |
| 6,499,036 B1 | 12/2002 | Gurevich |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,598,502 B1 | 7/2003 | Rosa |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,610,106 B1 | 8/2003 | Jenks |
| 6,611,844 B1 | 8/2003 | Saulpaugh et al. |
| 6,640,218 B1 | 10/2003 | Golding et al. |
| 6,654,734 B1 | 11/2003 | Mani et al. |
| 6,658,649 B1 | 12/2003 | Bates et al. |
| 6,665,664 B2 | 12/2003 | Paulley et al. |
| 6,687,734 B1 | 2/2004 | Sellink et al. |
| 6,691,301 B2 | 2/2004 | Bowen |
| 6,708,164 B1 | 3/2004 | Cseri et al. |
| 6,714,939 B2 | 3/2004 | Saldanha et al. |
| 6,728,953 B1 | 4/2004 | Walster |
| 6,742,054 B1 | 5/2004 | Upton, IV |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,785,685 B2 | 8/2004 | Soetarman et al. |
| 6,795,868 B1 | 9/2004 | Dingman et al. |
| 6,804,677 B2 | 10/2004 | Shadmon et al. |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,880,148 B1 | 4/2005 | Raph et al. |
| 6,941,511 B1 | 9/2005 | Hind et al. |
| 6,950,815 B2 | 9/2005 | Tijare et al. |
| 6,965,990 B2 | 11/2005 | Barsness et al. |
| 6,968,330 B2 | 11/2005 | Edwards et al. |
| 6,978,271 B1 | 12/2005 | Hoffman et al. |
| 7,043,555 B1 | 5/2006 | McClain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,107,265 B1 | 9/2006 | Calvignac et al. |
| 7,111,016 B2 | 9/2006 | Gurevich |
| 7,117,196 B2 | 10/2006 | Gaur et al. |
| 7,117,479 B2 | 10/2006 | Vanter |
| 7,120,645 B2 | 10/2006 | Manikutty et al. |
| 7,127,704 B2 | 10/2006 | Vanter et al. |
| 7,134,075 B2 | 11/2006 | Hind et al. |
| 7,139,765 B1 | 11/2006 | Balkany |
| 7,140,006 B2 | 11/2006 | Harrison, III et al. |
| 7,162,485 B2 | 1/2007 | Gottlob et al. |
| 7,167,856 B2 | 1/2007 | Lawder |
| 7,190,376 B1 | 3/2007 | Tonisson |
| 7,191,182 B2 | 3/2007 | Anonsen et al. |

(56) References Cited

U.S. PATENT DOCUMENTS

| | | | |
|---|---|---|---|
| 7,203,680 B2 | 4/2007 | Parida |
| 7,203,774 B1 | 4/2007 | Zhou et al. |
| 7,210,097 B1 | 4/2007 | Clarke et al. |
| 7,225,183 B2 | 5/2007 | Gardner |
| 7,225,199 B1 | 5/2007 | Green et al. |
| 7,263,525 B2 | 8/2007 | Shin |
| 7,287,026 B2 | 10/2007 | Oommen |
| 7,313,563 B2 | 12/2007 | Bordawekar et al. |
| 7,318,066 B2 | 1/2008 | Kaufman et al. |
| 7,318,215 B1 | 1/2008 | Krishnan et al. |
| 7,337,163 B1 | 2/2008 | Srinivasan et al. |
| 7,356,802 B2 | 4/2008 | Sutter et al. |
| 7,360,202 B1 | 4/2008 | Seshadri et al. |
| 7,386,541 B2 | 6/2008 | Pal et al. |
| 7,392,239 B2 | 6/2008 | Fontoura et al. |
| 7,403,940 B2 | 7/2008 | Narsude |
| 7,409,673 B2 | 8/2008 | Kuo et al. |
| 7,419,376 B2 | 9/2008 | Sarvazyan et al. |
| 7,421,648 B1 | 9/2008 | Davis |
| 7,437,666 B2 | 10/2008 | Ramarao et al. |
| 7,475,070 B2 | 1/2009 | Fan et al. |
| 7,478,100 B2 | 1/2009 | Murthy et al. |
| 7,493,305 B2 | 2/2009 | Thusoo et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker et al. |
| 7,544,062 B1 | 6/2009 | Hauschild et al. |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | Letourneau |
| 7,630,995 B2 | 12/2009 | Letourneau |
| 7,636,727 B2 * | 12/2009 | Schiffmann ....... G06F 17/30961 |
| 7,650,592 B2 | 1/2010 | Eckels et al. |
| 7,669,183 B2 | 2/2010 | Bowman et al. |
| 7,681,177 B2 | 3/2010 | Letourneau |
| 7,685,137 B2 | 3/2010 | Liu et al. |
| 7,720,830 B2 | 5/2010 | Wen et al. |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,792,866 B2 | 9/2010 | Linden et al. |
| 7,801,923 B2 | 9/2010 | Letourneau |
| 7,809,758 B2 | 10/2010 | Thurnhofer et al. |
| 7,827,523 B2 | 11/2010 | Ahmed et al. |
| 7,861,304 B1 | 12/2010 | Nachenberg et al. |
| 7,882,147 B2 | 2/2011 | Letourneau |
| 7,890,471 B2 | 2/2011 | Fan et al. |
| 7,890,927 B2 | 2/2011 | Eldridge et al. |
| 7,890,928 B2 | 2/2011 | Patrudu |
| 7,899,821 B1 | 3/2011 | Schiffmann et al. |
| 7,962,494 B2 | 6/2011 | Furusho |
| 8,005,869 B2 | 8/2011 | Corl, Jr. et al. |
| 8,020,145 B2 | 9/2011 | Fant |
| 8,032,828 B2 | 10/2011 | Su et al. |
| 8,032,860 B2 | 10/2011 | Piehler et al. |
| 8,037,102 B2 | 10/2011 | Letourneau |
| 8,060,868 B2 | 11/2011 | Meijer et al. |
| 8,086,998 B2 | 12/2011 | Bansal et al. |
| 8,112,740 B2 | 2/2012 | Meijer et al. |
| 8,151,276 B2 | 4/2012 | Grechanik et al. |
| 8,181,155 B2 | 5/2012 | Pinto et al. |
| 8,203,972 B2 | 6/2012 | Sauermann |
| 8,230,526 B2 | 7/2012 | Holland et al. |
| 8,250,526 B2 | 8/2012 | Anderson et al. |
| 8,290,977 B2 | 10/2012 | Chinchwadkar et al. |
| 8,307,102 B2 | 11/2012 | Skog |
| 8,316,059 B1 | 11/2012 | Schiffmann et al. |
| 8,321,478 B2 | 11/2012 | Fong |
| 8,332,428 B2 | 12/2012 | Bonneau et al. |
| 8,356,040 B2 | 1/2013 | Letourneau |
| 8,365,137 B2 | 1/2013 | Fant |
| 8,438,534 B2 | 5/2013 | Thomson et al. |
| 8,443,339 B2 | 5/2013 | Letourneau |
| 8,447,774 B1 | 5/2013 | Robie et al. |
| 8,458,191 B2 | 6/2013 | Bhattacharjee et al. |
| 8,484,236 B1 | 7/2013 | Andrews et al. |
| 8,606,794 B2 | 12/2013 | Amer-Yahia et al. |
| 8,612,461 B2 | 12/2013 | Schiffmann et al. |
| 8,615,530 B1 | 12/2013 | Letourneau |
| 8,626,777 B2 | 1/2014 | Letourneau |
| 8,645,346 B2 | 2/2014 | Dumitru et al. |
| 8,650,201 B2 | 2/2014 | Letourneau |
| 8,683,431 B2 | 3/2014 | Thomson et al. |
| 8,745,070 B2 | 6/2014 | Krishnamurthy et al. |
| 8,762,942 B2 | 6/2014 | Langworthy et al. |
| 8,868,621 B2 | 10/2014 | D'Onofrio et al. |
| 8,869,106 B2 | 10/2014 | Jazdzewski et al. |
| 8,930,896 B1 | 1/2015 | Wiggins |
| 8,935,232 B2 | 1/2015 | Abadi et al. |
| 8,990,769 B2 | 3/2015 | Letourneau |
| 9,002,862 B2 | 4/2015 | Schiffmann et al. |
| 9,015,202 B2 | 4/2015 | Letourneau |
| 9,020,961 B2 | 4/2015 | Letoruneau et al. |
| 9,043,347 B2 | 5/2015 | Letourneau |
| 9,077,515 B2 | 7/2015 | Letourneau |
| 9,167,579 B2 | 10/2015 | Fettweis et al. |
| 9,177,003 B2 | 11/2015 | Letourneau |
| 9,245,050 B2 | 1/2016 | Schiffmann et al. |
| 9,330,128 B2 * | 5/2016 | Schiffmann ....... G06F 17/30327 |
| 9,411,841 B2 | 8/2016 | Schiffmann et al. |
| 9,425,951 B2 | 8/2016 | Letourneau et al. |
| 9,430,512 B2 | 8/2016 | Letourneau et al. |
| 9,563,653 B2 | 2/2017 | Letourneau et al. |
| 9,563,663 B2 | 2/2017 | Shukla et al. |
| 9,646,034 B2 | 5/2017 | Schiffmann et al. |
| 9,646,107 B2 | 5/2017 | Letourneau et al. |
| 9,842,130 B2 | 12/2017 | Schiffmann et al. |
| 10,055,438 B2 | 8/2018 | Schiffmann et al. |
| 10,068,003 B2 | 9/2018 | Letourneau |
| 10,140,349 B2 | 11/2018 | Letourneau |
| 10,255,311 B2 | 4/2019 | Letourneau |
| 10,275,489 B1 | 4/2019 | Reddy et al. |
| 10,325,031 B2 | 6/2019 | Letourneau |
| 10,380,039 B2 | 8/2019 | Cooray et al. |
| 10,380,089 B2 | 8/2019 | Letourneau |
| 10,394,785 B2 | 8/2019 | Letourneau |
| 10,411,878 B2 | 9/2019 | Letourneau |
| 10,437,886 B2 | 10/2019 | Andrews et al. |
| 10,713,274 B2 | 7/2020 | Letourneau |
| 10,725,989 B2 | 7/2020 | Schiffmann et al. |
| 10,733,234 B2 | 8/2020 | Letourneau |
| 11,100,070 B2 | 8/2021 | Schiffmann et al. |
| 11,100,137 B2 | 8/2021 | Letourneau |
| 11,194,777 B2 | 12/2021 | Schiffmann et al. |
| 11,204,906 B2 | 12/2021 | Letourneau |
| 11,663,238 B2 | 5/2023 | LeTourneau |
| 2001/0003211 A1 | 6/2001 | Bera |
| 2001/0037496 A1 | 11/2001 | Simonyi |
| 2002/0023166 A1 | 2/2002 | Bar-Noy et al. |
| 2002/0040292 A1 | 4/2002 | Marcu |
| 2002/0059281 A1 | 5/2002 | Watanabe et al. |
| 2002/0062259 A1 | 5/2002 | Katz et al. |
| 2002/0091676 A1 | 7/2002 | Agrawal et al. |
| 2002/0107860 A1 * | 8/2002 | Gobeille ........... G06F 17/30961 |
| 2002/0129129 A1 | 9/2002 | Bloch et al. |
| 2002/0130796 A1 | 9/2002 | Tsuchido et al. |
| 2002/0130907 A1 | 9/2002 | Chi et al. |
| 2002/0133347 A1 | 9/2002 | Schoneburg et al. |
| 2002/0133497 A1 | 9/2002 | Draper et al. |
| 2002/0149604 A1 | 10/2002 | Wilkinson |
| 2002/0169563 A1 | 11/2002 | Ferreira |
| 2002/0194163 A1 | 12/2002 | Hopeman et al. |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0149934 A1 | 8/2003 | Worden |

(56) References Cited

U.S. PATENT DOCUMENTS

| | | |
|---|---|---|
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236787 A1 | 12/2003 | Burges |
| 2003/0236794 A1 | 12/2003 | Hostetter et al. |
| 2004/0003028 A1 | 1/2004 | Emmett et al. |
| 2004/0010752 A1 | 1/2004 | Chan et al. |
| 2004/0019599 A1 | 1/2004 | Trappen et al. |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060006 A1 | 3/2004 | Lindblad et al. |
| 2004/0060007 A1 | 3/2004 | Gottlob et al. |
| 2004/0068498 A1 | 4/2004 | Patchet et al. |
| 2004/0073541 A1 | 4/2004 | Lindblad et al. |
| 2004/0075677 A1 | 4/2004 | Loyall et al. |
| 2004/0103105 A1 | 5/2004 | Lindblad et al. |
| 2004/0122844 A1 | 6/2004 | Malloy et al. |
| 2004/0125124 A1 | 7/2004 | Kim et al. |
| 2004/0160464 A1 | 8/2004 | Reyna |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0267958 A1 | 12/2004 | Reed et al. |
| 2004/0268236 A1 | 12/2004 | Chidlovskii et al. |
| 2005/0021548 A1 | 1/2005 | Bohannon et al. |
| 2005/0021683 A1 | 1/2005 | Newton et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar et al. |
| 2005/0050016 A1 | 3/2005 | Stanoi et al. |
| 2005/0050066 A1 | 3/2005 | Hughes |
| 2005/0055369 A1 | 3/2005 | Gorelik et al. |
| 2005/0058976 A1 | 3/2005 | Vernon |
| 2005/0060320 A1 | 3/2005 | Bostrom |
| 2005/0060332 A1 | 3/2005 | Bernstein et al. |
| 2005/0065964 A1 | 3/2005 | Ziemann et al. |
| 2005/0065965 A1 | 3/2005 | Ziemann et al. |
| 2005/0097084 A1 | 5/2005 | Balmin et al. |
| 2005/0102636 A1 | 5/2005 | Mckeon et al. |
| 2005/0125432 A1 | 6/2005 | Lin et al. |
| 2005/0138073 A1 | 6/2005 | Zhou et al. |
| 2005/0149471 A1 | 7/2005 | Lassalle |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0171962 A1 | 8/2005 | Martin et al. |
| 2005/0187900 A1 | 8/2005 | LeTourneau |
| 2005/0195741 A1 | 9/2005 | Doshi et al. |
| 2005/0210014 A1 | 9/2005 | Asano |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1 | 12/2005 | Orr |
| 2005/0289125 A1 | 12/2005 | Liu et al. |
| 2006/0004817 A1 | 1/2006 | Andrews |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 12/2008 | Furusho |
| 2010/0094885 A1 | 4/2010 | Andrews |
| 2010/0094908 A1 | 4/2010 | Letourneau |
| 2010/0114969 A1 | 5/2010 | Letourneau |
| 2010/0191775 A1 | 7/2010 | Schiffmann et al. |
| 2010/0205581 A1 | 8/2010 | Letourneau |
| 2010/0318521 A1 | 12/2010 | Letourneau |
| 2011/0131259 A1 | 6/2011 | Letourneau |
| 2011/0282898 A1 | 11/2011 | Schiffmann et al. |
| 2011/0320499 A1 | 12/2011 | Letourneau |
| 2012/0144388 A1 | 6/2012 | Kurian et al. |
| 2013/0151566 A1 | 6/2013 | Schiffmann et al. |
| 2013/0198239 A1 | 8/2013 | LeToruneau |
| 2014/0040293 A1 | 2/2014 | Letourneau |
| 2014/0184430 A1 | 7/2014 | Jiang et al. |
| 2014/0289266 A1 | 9/2014 | Letourneau |
| 2014/0289278 A1 | 9/2014 | Schiffmann et al. |
| 2014/0289279 A1 | 9/2014 | Letourneau |
| 2014/0362961 A1 | 12/2014 | Letourneau |
| 2015/0193517 A1 | 7/2015 | Letourneau |
| 2015/0220582 A1 | 8/2015 | Letourneau |
| 2015/0242449 A1 | 8/2015 | Schiffmann et al. |
| 2015/0242450 A1 | 8/2015 | Letourneau |
| 2015/0310048 A1 | 10/2015 | Letourneau |
| 2015/0341165 A1 | 11/2015 | Letourneau |
| 2016/0117353 A1 | 4/2016 | Schiffmann et al. |
| 2016/0162528 A1 | 6/2016 | Letourneau |
| 2016/0283611 A1 | 9/2016 | Schiffmann et al. |
| 2016/0328431 A1 | 11/2016 | Schiffmann et al. |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0255660 A1 | 9/2017 | Schiffmann et al. |
| 2018/0107698 A1 | 4/2018 | Schiffmann et al. |
| 2019/0026326 A1 | 1/2019 | Schiffmann et al. |
| 2019/0034510 A1 | 1/2019 | Letourneau |
| 2019/0121795 A1 | 4/2019 | Schiffmann et al. |
| 2019/0129899 A1 | 5/2019 | Letourneau |
| 2019/0171628 A1 | 6/2019 | Letourneau |
| 2019/0236078 A1 | 8/2019 | Letourneau |
| 2019/0356465 A1 | 11/2019 | Letourneau |
| 2019/0377718 A1 | 12/2019 | Letourneau |
| 2019/0384753 A1 | 12/2019 | Letourneau |
| 2019/0384792 A1 | 12/2019 | Andrews et al. |
| 2020/0218707 A1 | 7/2020 | Letourneau |
| 2020/0372041 A1 | 11/2020 | Letourneau |
| 2020/0394168 A1 | 12/2020 | Schiffmann et al. |
| 2020/0394224 A1 | 12/2020 | Letourneau |
| 2021/0149860 A1 | 5/2021 | Letourneau |
| 2021/0349871 A1 | 11/2021 | Letourneau |

OTHER PUBLICATIONS

U.S. Pat. App. Pub. No. 2004/0073541 ("Lindblad"), United States, Apr. 15, 2004.

U.S. Pat. No. 7,809,758 ("Thurnhofer"), United States, Oct. 5, 2010.

Tree Representation of Positive Integers, 1994, Abe.

A New Bijection between Natural Numbers and Rooted Trees, 2005, Cappello.

An Algorithm for Subtree Identification, Apr. 1968, Matula.

The Art of Computer Programming Second Edition vol. 1 Fundamental Algorithms, 1973, Knuth.

Abe, Y. Tree Representation of Positive Integers, Applied Mathematics Letters vol. 7 No. 1, Jan. 1994, p. 57.

Cappello, Peter R., A New Bijection between Natural Numbers and Rooted Trees, Department of Computer Science, 2005, pp. 1-10.

Grimm, Tralics a LaTeX to XML translator, 2003.

Knuth, Donald E., The Art of Computer Programming Second Edition vol. 1 Fundamental Algorithms, 1973.

Matula, David W., An Algorithm for Subtree Identification, Apr. 1968.

The Lucene system, which was allegedly used, offered for sale, or sold at least by Nov. 29, 2004, as described by reference to the enclosed documents concerning the structure, function, operation, and/or features of Lucene.

(56) References Cited

OTHER PUBLICATIONS

Sechrest et al., "Blending Hierarchical and Attribute-Based File Naming", Distributed Computing System, 1992, Proceedings of the 1 ih International Conference on Jun. 9-12, 1992, pp. 572-580.
Shanmugasundaram et al., "Querying SML Views of Relational Data", Proceedings of the 2th VLDB Conference, Roma, Italy, 2001, 9 pages.
Siegel, "All Searches Are Divided into Three Parts String Searches Using Ternary Trees", ACM, pp. 57-68, 1988.
Sinha et al., "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer—Verlag Berlin Heidelberg, @1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Stefanov "Algorithmic Transformation Techniques for Efficient Exploration of Alternative Application Instances" Journal for the Association for Computing Machinery (ACM) (2002) pp. 7-12, 6 pages, Doc 2234.
Talukdar, "Learning to Create Data-Integrating Queries", ACM PVLDB, pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Vion-Dury, "Experimenting with the Circus Language for XML Modeling and Transformation", ACM pp. 82-87 (2002), Doc 2352.
Wagner et al., "The String-to-String Correction Problem", Journal of the Association for Computing Machinery, vol. 21, No. 1, pp. 168-173, 1974.
Wu, "A Prime No. Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yang, "Interactive Hierarchical Dimension Ordering, Spacing and Filtering for Exploration of High Dimensional Datasets", IEEE, pp. 1-8 (Year: 2013), 8 pages, Doc 2324.
Yates et al., "A New Approach to Text Searchin", Communications of the ACM, vol. 35, No. 10, pp. 7 4-82, 1992.
Zaks, S., "Lexicographic Generation of Ordered Trees", Dept. of Computer Science, University of Illinois, The Journal of Theoretical Computer Science, vol. 10(1 ), pp. 63-82, Revised 1978.
Zanibbi, "Recognizing Mathematical Expressions Using Tree Transformation," IEEE, pp. 1455-1467 (2002), Doc 2353.
Zhang, B ed-Tree: An All-Purpose Index Structure for String Similarity Search.
"Core Technology Benchmarks A White Paper", Jul. 2002, downloaded from the internet Mar. 2, 2004.
"Origin Data, Inc. White Paper", @1999, pp. 1-13.
"The Associative Model of Data White Paper", Lazy Software, Ltd., 2000.
ACM Portal Search Results (Kleene and prime and enumeration and operation and natural and numerals and sequences and enumeration and operation) conducted by Examiner on Jul. 18, 2009, 1 page.
ACM Portal Search Results (Kleene and prime and enumeration and operationand natural and numerals and sequences and "enumeration operation") conducted by Examiner on Jul. 18, 2009, 6 pages.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime No. Theorem", Engineering and Science, No. 4, 1996.
Benedikt et al., "Definable Relations and First-Order Query Languages over Strings" Journal of the ACM, vol. 50, No. 5, pp. 694-751, 2003.
Boppana et al., "Full Fault Dictionary Storage Based on Labeled Tree Encoding", Proceedings of 14th VLSI Test Symposium, 1996, pp. 17 4-179.
Borodin et al., "A Tradeoff Between Search and Update Time for the Implicit Dictionary Problem", Theoretical Computer Science vol. 1 No. 4 (1990), 425-447.
Cano et al., "Lazy Evaluation in Penniless Propagation over Join Trees", Networks, vol. 39(4), 2002 Wiley Periodicals, Inc., 175-185, 2002.
Caviness et al., "Simplification of Radical Expressions", ACM, pp. 329-338, 1976.
Coenen, Frans; Leng, Paul and Ahmed, Shakil; "T-Trees, Vertical Partitioning and Distributed Association Rule Mining", IEEE, 2003.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "Oh! Pascal!", 1982, W.W. Norton & Company, Inc., Chapter 12, Arrays for Random Access, pp. 295-327.
Dubiner, M., Galil, Z., and Magen, E. "Faster Tree Pattern Matching. ", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees. html, 1998.
Er, M.C., "Enumerating Ordered Trees Lexicographically", The Computation Journal, vol. 28, Issue 5, pp. 538-542, 1985.
Ferragina et al., "The String B-Tree: A New Data Structure for String Search in External Memory and Its Applications", Journal of the ACM, vol. 46, No. 2, pp. 236-280, 1999.
Fluri, "Change Distilling: Tree Differencing for Fine-Grained Source Code Change Extraction", IEEE pp. 725-743 (2007), Doc 2354.
Google Search (Kleene prime enumeration operation natural numerals sequences "enumeration operation") conducted by Examiner on Jul. 18, 2009, 2 pages.
Google search (Kleene prime enumeration operation natural numerals sequences "Kleene prime") conducted by Examiner on Jul. 18, 2009, 2 pages.
Google Search (Kleene prime enumeration operation) conducted by Examiner on Jul. 18, 2009, 2 pages.
Hirschberg, "Algorithm for Computing Maximal Common Sebsequences", Communication of the ACM, vol. 18, No. 6, pp. 341-343, 1975.
Hoffman et al., "Pattern Matching in Trees", Purdue University, Jan. 1982, Journal for the Association for Computing Machinery, vol. 29, Issue 1 , pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Jaiswal, "Local Pattern Transformation Based Feature Extraction Techniques for Classification of Epileptic EEG Signals", Biomedical Signal Processing and Control (2017) pp. 81-92, 12 pages, Doc 2205.
Johnston et al. Advances in Dataflow Programming Languages, ACM Computing Surveys, vol. 36, No. 1, pp. 1-34, 2004.
Katajainen et al., "Tree Compression and Optimization with Applications", International Journal of Foundations of Computer Science, vol. 1 No. 4 (1990), 425-447.

(56) References Cited

OTHER PUBLICATIONS

Kharbutli et al., "Using Prime Nos. for Cache Indexing to Eliminate Conflict Misses", Dept. of Electrical and Computer Engineering, North Carolina State University, Feb. 2004, 24 pages.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

Knott—"A Balanced Tree Storage and Retrieval Algorithm" ACM pp. 175-196, 1971, Doc 2296.

Knuth, "The Art of Computer Programming", vol. 1 Fundamental Algorithms, Second edition, Addison-Wesley Series in Computer Science and Information Processing, ISBN 0-201-03809-9, Reading, Massachusetts, Copyright 1973.

Leinonen et al., "Automation of Document Structure Transformations", Auditorium, Microteknia Building, University of Kuopio, Nov. 5, 2004, 68 pages.

Lerman et al., "Learning the Common Structure of Data", American Association for Artificial Intelligence, AAAI-00 Proceedings, www.aaai.org, Apr. 13, 2000, 6 pages.

Letourneau, "The Elementary Theory of Object Oriented Arithmetic", pp. 1-9, Apr. 1990.

Li—"An Immediate Approach to Balancing Nodes in Binary Search Trees" ACM, pp. 238-245, 2006, Doc 2242.

Malhotra et al., "A Methodology for Formal Expression of Hierarchy in Model Solution", IEEE, pp. 258-267, 1983.

Minn, "Linear Transformation of Multi-Level Signal Set in Multi-Code Cdma", IEEE (2001) pp. 1239-1243, 5 pages, Doc 2214.

Murray, "Code Transformation and Instruction Set Extension", Journal of the Association for Computing Machinery (2009) pp. 1-31, 32 pages, Doc 2215.

Navarro, "A Guided Tour to Approximate String Matching", ACM Computing Surveys, vol. 33, No. 1, pp. 31-88, 2001.

Neven, Frank and Thomas Schwentick, "Expressive and efficient pattern languages for tree-structured data" Proceedings of the Nineteenth Acm Sigact-Sigmod-Sigart Symposium on Principles of Database Systems, May 2000.

Paik, "Mining Association Rules in Tree Structured XML Data" ACM, pp. 807-811, 2009, 5 pages, Doc 2243.

Prasad et al., "Efficient Bit-Parallel Multi-Patterns String Matching Algorithms for Limited Expression", ACM, pp. 1-6, 2010.

Ramesh, R. and Ramakrishnan, I.V., "Nonlinear Pattern Matching in Trees." Journal of the Association for Computer Machinery, vol. 39, No. 2. Apr. 1992, pp. 295-316.

Reiss, "Semantics-Based Code Search", IEEE ICSE, pp. 243-253, 2009.

Rizum, "Code Transformation by Direct Transformation of ASTs", Journal of the Association for Computing Machinery (2015) pp. 1-7, 7 pages, Doc 2220.

Sahinalp, "Distance Based Indexing for String Proximity Search", IEEE, pp. 125-136 (2003), Doc 2355.

Schmidt et al., "Comparision of Tree and Graph Encodings as Function of Problem Complexity", ACM, pp. 1674-1679, 2007.

\* cited by examiner $P(1) = 2$ $P(2) = 3$ $P(3) = 5$ $P(4) = 7$ $\vdots$ $P(2k - 1)$ $P(2k)$ $\vdots$

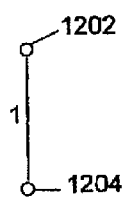
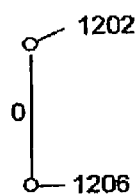
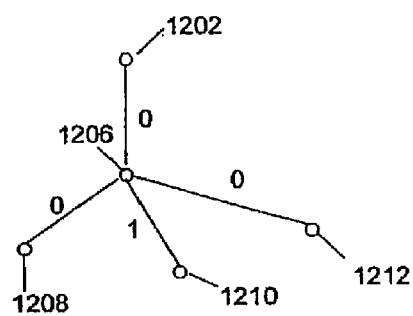
Figure 9  Figure 10
Figure 11

ENUMERATION OF ROOTED PARTIAL SUBTREES

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

Figure 5:
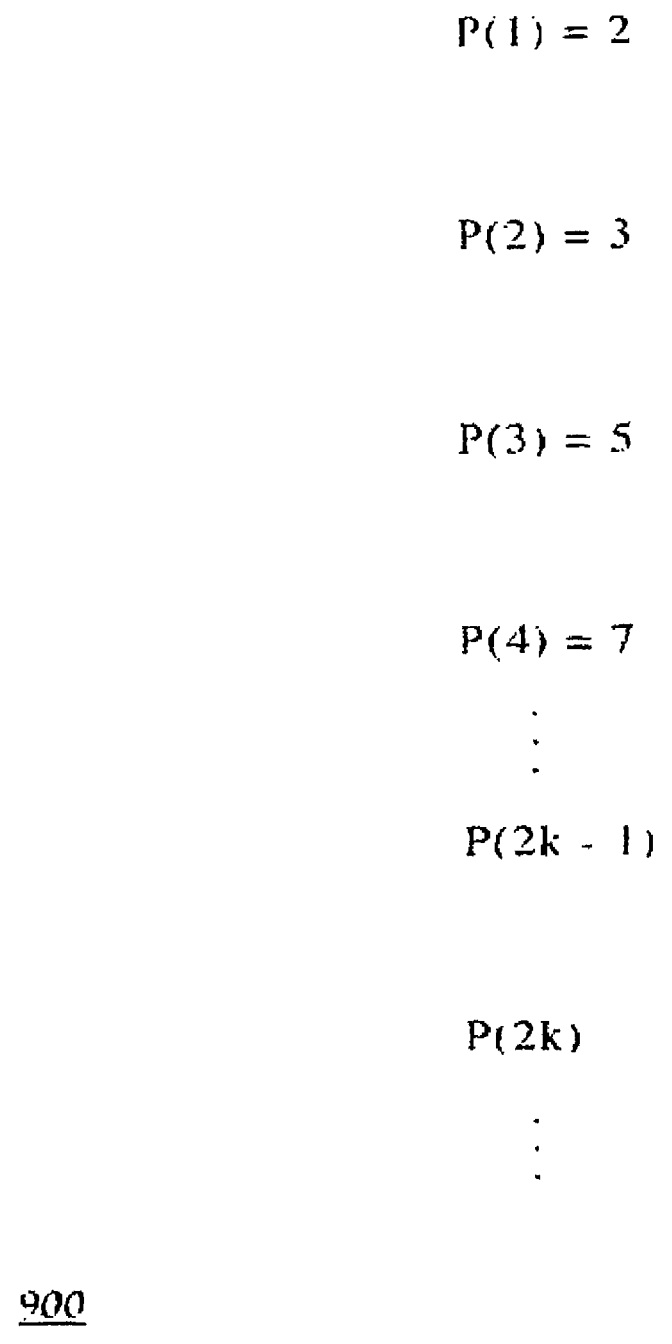

FIG. 5 is a table illustrating a portion of the Kleene enumeration of non-composite numerals;

FIGS. 8 through 11 are schematic diagrams illustrating, by way of example, rooted partial subtrees (RPSTs) according to an embodiment.

DETAILED DESCRIPTION

Figure 1:
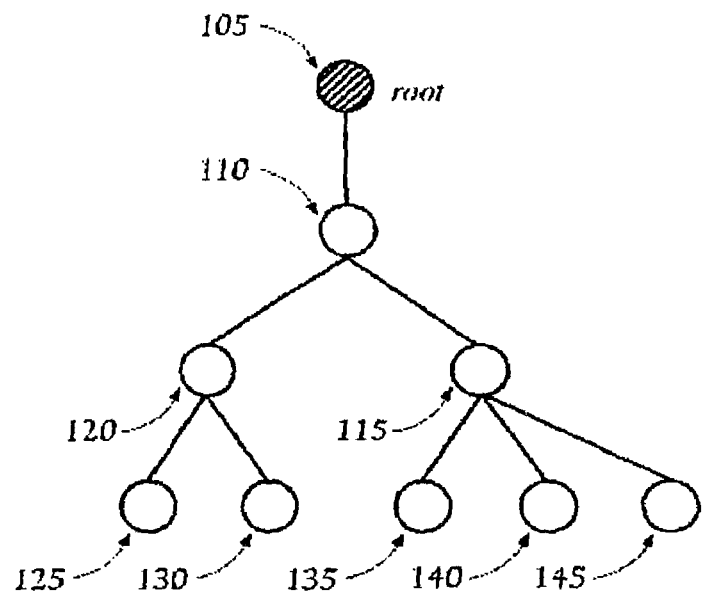
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
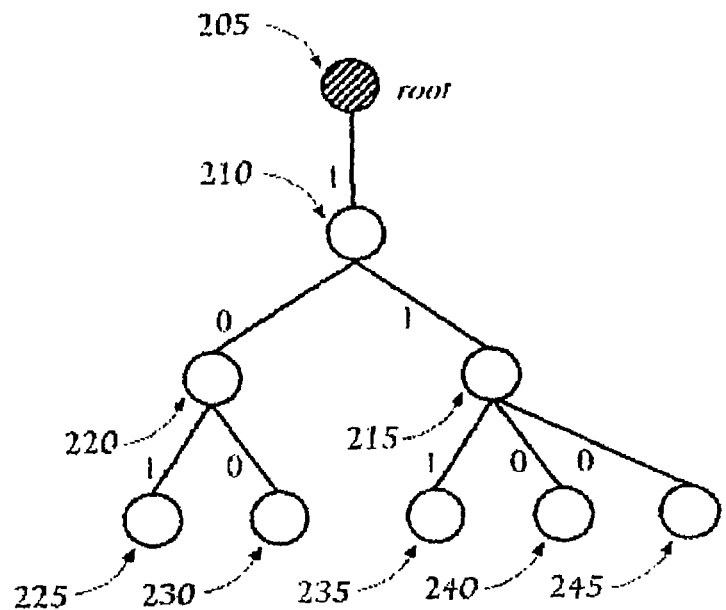
FIG. 2 is a schematic diagram illustrating one embodiment of a binary edge labeled tree (BELT)
Figure 3:
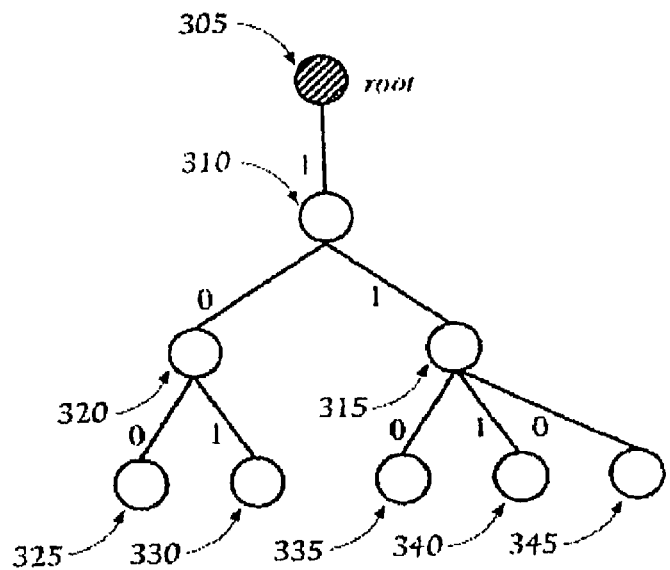
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar to the embodiment of FIG. 2. Without belaboring the present discussion, additional descriptions of how BELTs may represent a hierarchy of, data may be found in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Figure 4:
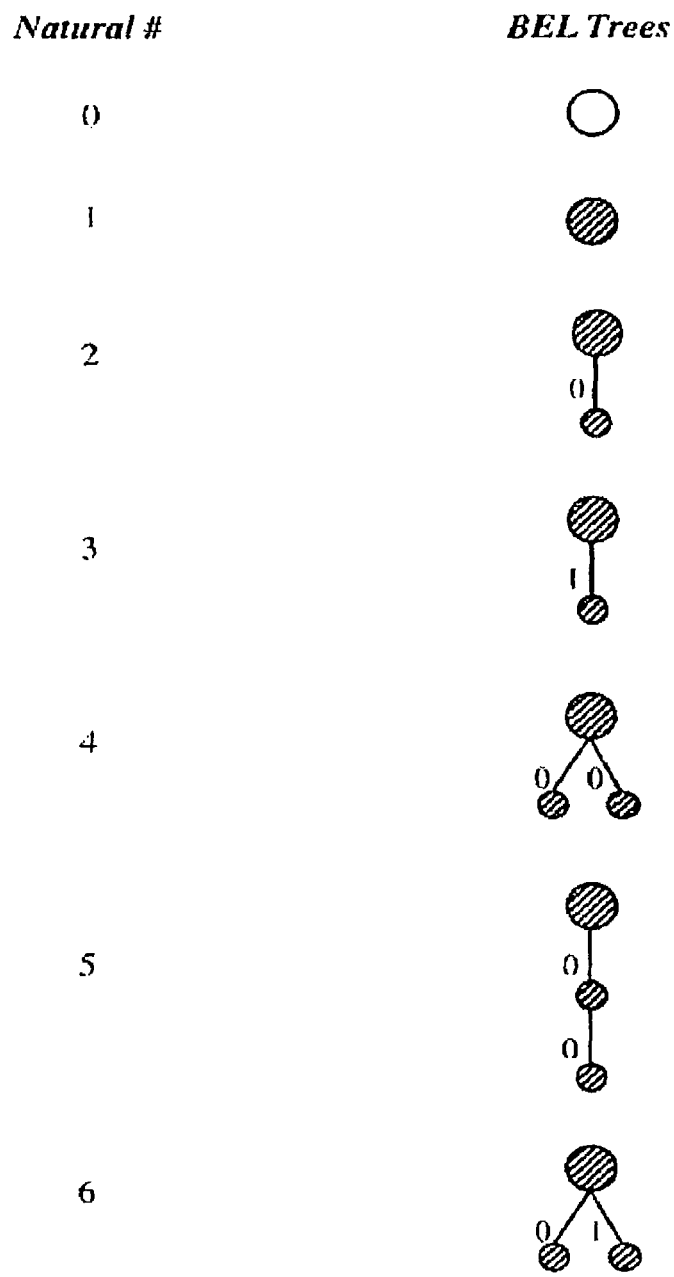
FIG. 4 is a table illustrating a particular embodiment of an association between natural numerals and BELTS.

Binary edge labeled trees may also be enumerated. Thus, for this particular embodiment, although the claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 4 (circle). Likewise, the one node tree, which holds no data, is associated with the numeral one and has a graphical representation of a single node. For higher positive natural numerals, however, this embodiment of a method of enumerating a set of trees comprises positioning a tree at location k, k being a positive numeral greater than three, where k is the product of u and v, u and v comprising positive numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example in FIG. 4, as described in more detail below.

However, for this particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the zero and has a symbolic representation as illustrated in FIG. 4 (circle). Likewise, the one node tree, which holds no data, is associated with the numeral one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with the numeral zero. Likewise, the one node tree root comprises a single node and is associated with the numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises $2k-1$, whereas the non-composite index of the one-push of the tree comprises $2k$, where the index corresponds to the argument of the well-known Kleene enumeration on positive natural numerals of non-composite numerals, as illustrated, for example, in part in FIG. 5. Thus, referring again to FIG. 4, the one-push of the root tree is the tree at position three. This follows from FIG. 5 since $P(2*1)=P(2)=3$. Likewise, the tree at position five is the zero-push of the tree at position 2. Again, this follows from FIG. 5 since $P(2*2-1)=P(3)=5$.

In this context, the approach just described may be referred to as vectorizing non-composite numerals. In the embodiment just described, this was accomplished in pairs, although, of course, the claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the kleene enumeration of non-composite numerals, P(index), such as provided in FIG. 5.

In the previously described enumeration of binary edged labeled trees, a mechanism may be employed to reduce or convert complex manipulations of hierarchical data to multiplication of natural numerals. For example, if it is desired to combine, or merge at their roots, two trees of hierarchical data, a complex task both computationally and graphically, instead, for this particular embodiment, the two trees may be converted to numerical data by using the previously described association embodiment between binary edge labeled trees and natural numerals. The resulting numerical data from the prior conversion may then be multiplied, and the resulting product may then be converted to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above Sand hereinafter, and the claimed subject matter is intended to cover all such enumeration and association embodiments.

Likewise, a process embodiment that is a reversal to the previously described embodiments may also be employed. Thus, complex hierarchies of data may be split or divided, when this is desired. For example, a binary edge labeled tree to be divided may be converted to a piece of numerical data, such as by using the previously described association embodiment. This data may then be factored into two pieces of numerical data whose product produces the previously mentioned piece of numerical data. These two pieces of numerical data may then be converted to trees, again, by using the prior association embodiment, for example.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve converting the trees to numerical data, as previously described, using an association embodiment. The numerical data may then be ordered and the numerical data may then be converted back to binary edge labeled trees using the previously described association embodiment, or an alternate association embodiment, for example.

It is noted that there may be any one of a number of different ways of converting from numerals or numerical data values to a binary edge labeled tree or from a binary string to a binary edge labeled tree, and vice-versa. Nonetheless, a convenient method for doing so with this particular embodiment includes storing a table providing an association embodiment between natural numerals, binary strings and binary edge labeled trees, such as the embodiment previously described. Thus, once it is desired to convert from one to the other, such as from a binary string to a BELT, from a natural numeral to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with the claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree. For example, and as shall be described in more detail below in connection with FIG. 6, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 6:
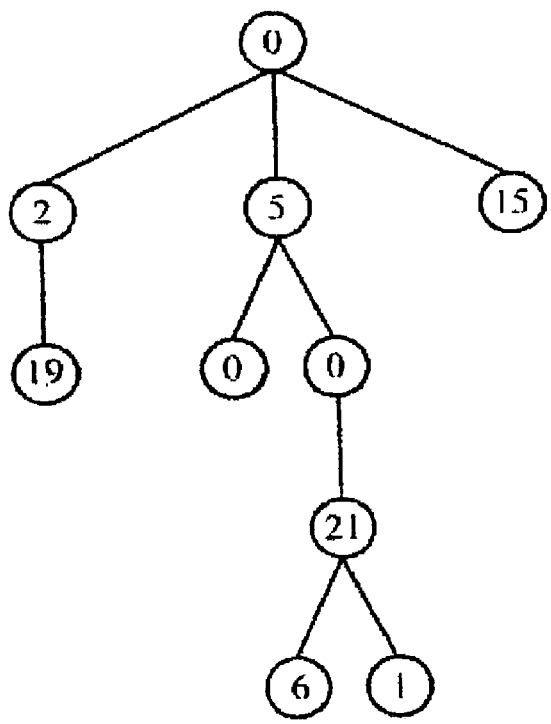
FIG. 6 is a schematic diagram of an embodiment of a node labeled tree.

As previously noted, the claimed subject matter is not limited in scope to this particular example, however, as illustrated in more detail hereinafter, the tree illustrated in FIG. 6 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and numerals, such as previously described, is depicted or enumerated in terms of binary edge labeled trees, as previously illustrated, for example. Thus, in this example, a particular tree, embodiment 1100, is illustrated in FIG. 6, comprises a node labeled tree rather than an edge labeled tree. Without belaboring the present discussion, a process of converting a node labeled tree such as that illustrated in FIG. 6 to a BELT may be found in U.S. patent application Ser. No. 11/005,859 filed on Dec. 6, 2004, by J. J. LeTournesu, titled, "Manipulating Sets of Hierarchical Data," assigned to the assignee of the presently claimed subject matter.

Figure 7:
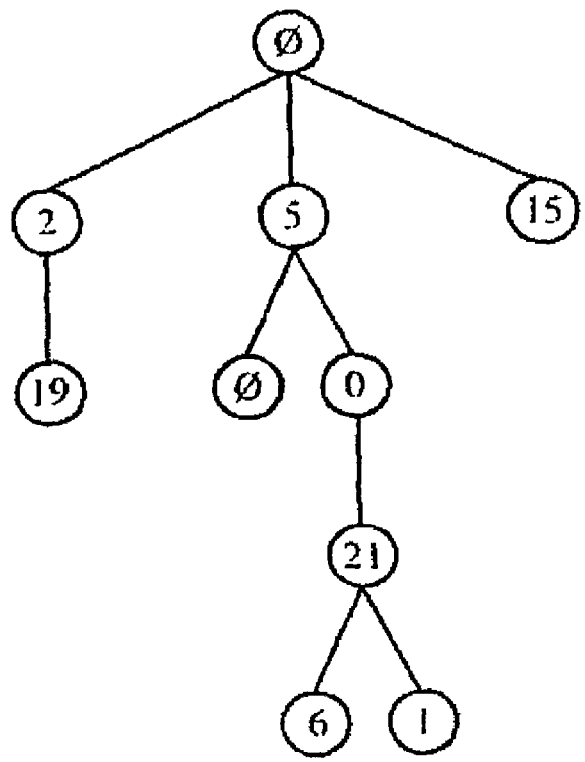
FIG. 7 is a schematic diagram illustrating another embodiment of a node labeled tree.

In another embodiment, however, a particular tree may include null types or, more particularly, some node values denoted by the empty set. This is illustrated, for example, by the tree in FIG. 7, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data. A tree with nulls may be converted to a tree without nulls as described in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described above, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the previously described embodiment, for example.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

According to an embodiment, a tree may be expressed as one or more "subtrees" merged at the root node of the tree. A subtree is coupled to the root node of the tree at an edge and independently has properties of a tree, except that the subtree is part of a larger tree. For example, here, a subtree comprises at least a "root" node coupled by an edge to a root node of the larger tree. Additional nodes and edges may be coupled to the root node of the subtree. While a subtree may comprise an edge coupled to the root node of the tree, the size and shape of the subtree may express information like that of a tree having the same size and shape as the subtree. The subtrees merged together at the root node of a tree may be referred to as "subtree children" of the tree node and any particular one of such subtrees may be referred to as a "subtree child" of the tree in this embodiment. Also, like a tree, a subtree may be represented as a natural numeral according to an association of trees with natural numerals as illustrated with reference to FIG. 4, for example. The subtrees making up a larger tree may be enumerated from a finite number of nodes according to a process described in U.S. patent application Ser. No. 11/006,440, filed on Dec. 6, 2004, by Karl Schiffmann, LeTourneau, titled, "Enumeration of Trees from a Finite Number of Nodes," assigned to the assignee of the presently claimed subject matter. However, the claimed subject matter is not limited in this respect.

According to an embodiment, a tree having a root node may be comprise one or more "rooted partial subtrees" (RPSTs) representing at least a portion of the hierarchical data represented by the tree. In this particular embodiment, a component RPST of a tree may comprise the same root node as the full tree, one or more other nodes in the tree coupled to the root node by intermediate nodes, the intermediate nodes themselves, and edges in the tree coupling the root node, the one or more other nodes and the intermediate nodes to one another. A component RPST of a full tree defines a connected path between the root node of the full tree and any other node in the component RPST along one or more edges in the tree, and any intermediate nodes. Accordingly, a component RPST may independently have properties of a tree, except that the RPST is part of a larger tree. Having properties of a tree, in a particular embodiment, a component RPST may comprise a finite, rooted, connected, unordered acyclic graph as illustrated with reference to FIGS. 1-7. As such, in a particular embodiment, any labels associated with nodes and edges in the full tree may also be associated with corresponding nodes and edges in any component RPST. Also, in a particular embodiment, such a component RPST may be represented by a natural numeral according to an association of natural numerals and trees as illustrated above with reference to FIG. 4, for example.

While a subtree and RPST of a full tree may represent portions of a graphical representation of the full tree and/or hierarchical data expressed in the full tree, properties of a subtree and RPST may be distinguished. In a particular embodiment, if the RPST comprises a child node coupled to the root node of the full tree, the RPST need not include all nodes and edges depending from the child node. Also, an RPST may comprise two or more child nodes connected to the root node of the full tree by respective edges. However, these are merely examples of properties that may distinguish an RPST from a subtree in a particular embodiment, and the claimed subject matter is not limited in this respect.

Since a tree is finite, there are a finite number of paths between a root node of the tree and any other node in the tree. Similarly, there are a finite number of combinations of paths between the root node of a tree and individual ones of the other nodes in the tree. Accordingly, in a particular embodiment, a finite number of RPSTs may be enumerated from a tree having a root node. Natural numerals may be associated with the enumerated RPSTs based, at least in part, on an association between trees and natural numerals such as, for example, illustrated above with reference to FIG. 4. However, this is merely an example embodiment and the claimed subject matter is not limited in this respect.

According to an embodiment, the enumerated RPSTs of a tree may be represented as a "set" containing a collection of unordered elements. In a particular embodiment, the elements of the set of enumerated RPSTs may contain as elements natural numerals representing individual ones of the enumerated RPSTs according to the aforementioned association between trees and natural numerals. The elements of such a set may be alternatively expressed as graphical representations of the individual ones of the enumerated RPSTs. In a particular embodiment, a one-to-one mapping may relate elements of the set of RPSTs expressed as natural numerals and elements of the set of RPSTs expressed as graphical representations. Here, such a mapping may enable converting graphical representations of RPSTs to corresponding natural numerals and manipulation of such natural numerals to provide resulting natural numerals. The resulting natural numerals may then be converted back to graphical representations. However, these are merely examples of how a set of enumerated RPSTs may be expressed and the claimed subject matter is not limited in these respects.

For a particular embodiment, a "full tree" is defined as an integral tree comprising all of its nodes, edges coupling the nodes to one another and any labels associated with the nodes or edges. Therefore, a full tree includes all of its nodes and elements completely connected. Also, such a full tree may be represented by a natural numeral denoted here as "FT." The notation "{RPSTs::FT}" provides a shorthand notation for this particular embodiment to indicate the set of unique, unordered RPSTs that may be formed from a full tree "FT," In one embodiment, the elements of {RPSTs::FT} may comprise natural numerals representing corresponding component RPSTs. As shown in FIGS. 8 through 11, where FT represents tree 1200, elements of {RPSTs::FT} comprise the component RPSTs shown in FIGS. 9, 10 and 11 (among other component RPSTs as illustrated below).

Figure 8:
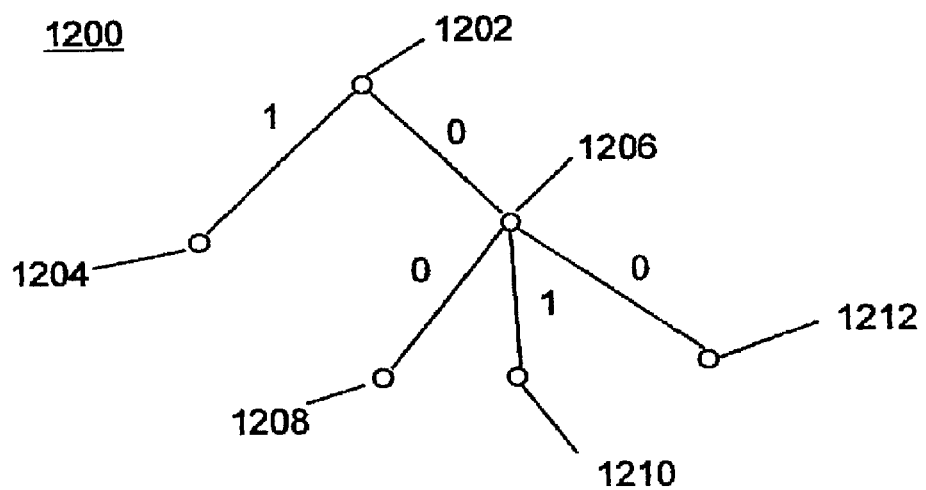

FIG. 8 is a schematic diagram of a tree 1200 illustrating, by way of example, RPSTs of tree 1200. Tree 1200 comprises a root node 1202 and nodes 1204, 1206, 1208, 1210 and 1212 coupled to the root node 1202 by edges and intermediate nodes. In the presently illustrated embodiment, tree 1200 comprises a BELT. It should be understood, however, that other types of trees (either labeled trees or unlabeled structure trees) may similarly comprise RPSTs and that the claimed subject matter is not limited in this respect.

FIGS. 9, 10 and 11 are schematic diagrams of some RPSTs of tree 1200 according to an embodiment. These RPSTs include root node 1202 of tree 1200, at least one other node of tree 1200, and any edges or intermediate nodes in tree 1200 coupling the at least one other node to the root node 1202. However, it should also be understood that the set of RPSTs of tree 1200 may also include, for example, a single node 1202 or the full tree 1200. FIGS. 9 and 10 show RPSTs including root node 1202 and one other node in tree 1200 which connected via an edge in tree 1200 between root node 1202 and the one other node. FIG. 11 shows an RPST including root node 1202, nodes 1208, 1210 and 1212, and intermediate node 1206 coupling the root node 1202 to the nodes 1208, 1210 and 1212. It should be understood that FIGS. 9, 10 and 11 are merely examples of RPSTs that may be formed from tree 1200, and that these examples are not intended to provide an exhaustive enumeration of RPSTs that may be formed from tree 1200.

Figure 12:
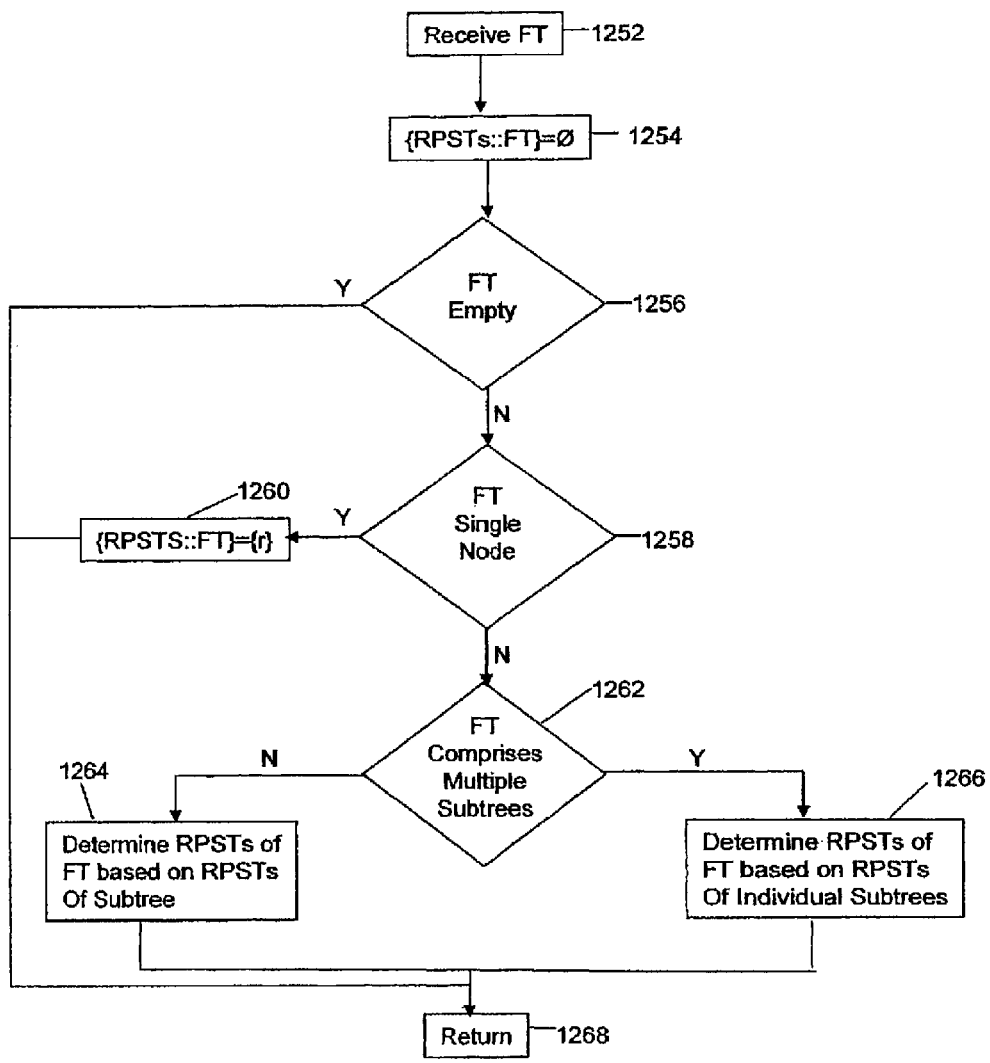
FIG. 12 is a flow diagram illustrating a process to enumerate RPSTs from a tree according to an embodiment.

FIG. 12 is a flow diagram illustrating a process 1250 to enumerate RPSTs from a tree according to an embodiment. In this particular embodiment, the process 1250 may enumerate the RPSTs of full tree FT to define elements of {RPSTs::FT} as a result. FT may be represented as a natural numeral received at block 1252. {RPSTs::FT} may be initialized as the empty set at block 1254 to be subsequently filled with elements representing RPSTs enumerated in subsequent portions or process 1250.

According to an embodiment, the process 1250 recognizes that the full tree may represent any one of four different configurations: an empty tree; a single node tree; a tree comprising a single subtree connected to a root node of the full tree by an edge; and two or more subtrees connected to the root node of the full tree by respective edges. Accordingly, the process 1250 enumerates the RPSTs of the full tree based, at least in part, on the particular configuration of the full tree. Diamond 1256 determines whether FT represents an empty tree containing no nodes. If so, {RPSTs::FT} remains defined as the empty set and process 1250 terminates at block 1268. If diamond 1258 determines that FT contains a single node tree, block 1260 updates {RPSTs::FT} to include a natural numeral expressing a single node tree (here, {r}).

At diamond 1262 through block 1268, process 1250 enumerates RPSTs based, at least in part, on the configuration of the full tree as having either a single subtree connected to the root node of the full tree by an edge, or two or more subtrees connected to the root node by respective edges. If FT represents a single subtree connected to the root node of the full tree by an edge, block 1264 enumerates the RPSTs of the single subtree. Here, the RPSTs of the full tree may be determined, at least in part, from the RPSTs of the single subtree.

If FT represents a full tree having two or more subtrees connected to the root node of the tree by respective edges, block 1266 may enumerate the RPSTs of the individual ones of the two or more subtrees. At least some of the RPSTs of the full tree may be determined, at least in part, from RPSTs of the individual subtrees. Block 1266 may then enumerate additional RPSTs of the full tree based, at least in part, combinations of the enumerated RPSTs merged at the root node of the full tree.

According to an embodiment, blocks 1264 and 1266 may be carried out by recursive execution of at least a portion of the process 1250. At block 1264, for example, the single subtree of the full tree may itself comprise two or more subtree children connected by respective edges to a node. Block 1264 may execute portions of block 1266 to enumerate the RPSTs of the subtree based, at least in part, on RPSTs enumerated from individual ones of the subtree children of the single subtree. Similarly, block 1266 may enumerate RPSTs of individual ones of the subtrees connected to the root node of the full tree by executing portions of block 1264.

Figure 13:
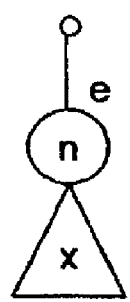
FIG. 13 is a schematic diagram illustrating a generalized representation of an embodiment of a subtree according to an embodiment.

FIG. 13 is a schematic diagram illustrating a representation an embodiment of a subtree comprising an edge having a label "e" with a subtree root node having a label "n" where "e" and "n" may be represented by discrete values (e.g., Boolean, binary, integer, natural numeral and/or whole numeral values). A value associated with a "child tree" of the subtree may be represented by "x" which may represent information expressed as a natural numeral according to an association of natural numerals with trees as illustrated above with reference to FIG. 4. Like a tree, subtree and RPST, such a child tree may have properties of a tree and be associated with a natural numeral according to an association between trees and natural numerals. However, this is merely an example of a representation of a subtree and its child tree, and the claimed subject matter is not limited in this respect.

As described below in connection with relation (1), a push operation may define a relationship between a subtree and a child tree of the subtree. As an association between trees and natural numerals may associate particular trees with natural numerals (e.g., as illustrated in FIG. 4), a push operation may define a relationship between a natural numeral associated with a subtree and a natural numeral associated with a child tree of the subtree. Similarly, a push operation may also define a relationship between natural numerals representing RPSTs of the child tree and natural numerals associated with at least some of the RPSTs of the subtree. A value of, or natural numeral associated with, the subtree shown in FIG. 13 may be expressed as the result of a push operation on the child tree having the value x. Such a push operation on the child tree may be represented in relation (1) as follows:

$$\text{push}(j,k,x)=P[kx+j-k+(2-r)], \text{ if } j<k \text{ and } k>0 \quad (1)$$

where:
P(m)=Kleene enumeration function for generating a sequence of non-composite numerals illustrated with reference to FIG. 5;
k=total number of values possible for a label;
j=actual computed label index value;
x=value of, or natural numeral associated with, "pushed" child tree; and
r=defined value of tree system root/single node tree (e.g. either 0 or 1).

It should be understood that while the push operation of relation (1) is suitable for performing specific embodiments described herein, this push operation is merely an example of how a push operation may be performed and the claimed subject matter is not limited in this respect. Additionally, it should be noted that the value of "r" is selected based upon a particular association of natural numerals and trees according to an association embodiment. Here, such an association of natural numerals may define a particular natural numeral to represent a tree comprising a single node. In the association of natural numeral with trees of FIG. 4, for example, the single node is associated with "1" defining r=1. However, this is merely an example of how a natural numeral may represent a single node for a particular association embodiment and the claimed subject matter is not limited in this respect.

It should also be noted that "j" (the actual computed label index value associating the root node with the pushed subtree) is a function of the specific values of "e" (the specific edge label) and "n" (the specific node label). In the particular case of a BELT, for example, there may be no node values such that "j"="e". The value of "k" (total number of possible index values) may be determined as function of the possibilities of values of "e" (edge label value) and "n" (node label value) and, in a particular embodiment, "k" may be determined as the number of possibilities for "e" multiplied by the number of possibilities for "n." Again, in the particular case of a BELT, "k" equals the number of possibilities for the value "e" since there are no node labels.

The techniques described herein for enumerating RPSTs of a full tree may be applied to any particular type of tree. For illustration purposes, particular examples described herein are directed to enumerating RPSTs of a BELT. Accordingly, while it is understood that an actual computed index value associating the root node with the pushed subtree may be determined from node labels (having a value "n") and/or edge labels (having a value "e"), for simplicity the remaining discussion will denote the actual computed label index value "j" as an edge label value of an edge connecting a root node of a tree to a pushed child tree.

Figure 14:
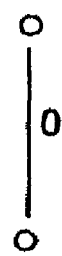
FIGS. 14 and 15 are schematic diagrams illustrating applications of one embodiment of a push operation according to an embodiment.
Figure 15:

In enumerating at least some RPSTs of a tree based, at least in part, on enumerated RPSTs of a subtree of the RPST, it may be useful to express a push operation on multiple RPSTs in a single push operation. In addition to applying a push operation to a tree having a value x, the push operation may be applied to multiple trees or tree elements of a set (here, an unordered collection of elements representing trees, RPSTs, subtrees and/or child trees of a subtree) in relation (2) as follows:

$$\text{push}[j,k,\{a,b,c\}]=\{\text{push}(j,k,a)\}U\{\text{push}(j,k,b)\}U\{\text{push}(j,k,c)\} \quad (2)$$

where a, b and c are numerical representations of tree elements in the pushed set. The result of the operation of relation (2) may be referred to as a "pushed set" of tree elements, FIGS. 14 and 15 illustrate applications of the push operation of relation (1) to specific subtrees. FIG. 14 shows a BELT having a value of "2" according to the association of trees and natural numerals shown in FIG. 4. As such, a push operation on this tree would define x=2, k=2 and r=1. FIG. 15 illustrates the result of a push of the tree in FIG. 14 by an edge having a label zero (i.e., a zero-push). The value of j for this push operation is zero. Accordingly, the push operation provides a numeral associated with the pushed BELT as follows:

$$\text{push}(j,k,x)=P[2*2+0-2+2-1]=P[3]=5.$$

It should be understood, however, the application of the push operation of relation (1) a BELT as illustrated in FIGS. 14 and 15 are merely particular examples of the push operation and the push operation may be similarly applied to non-BELT trees.

To enumerate RPSTs of a subtree of a full tree, it may be useful to determine a natural numeral associated with a child tree of the subtree based, at least in part, on a natural numeral associated with the subtree (the natural numerals being based, at least in part, on an association between trees and natural numerals). Like the push operation of relation (1), according to an embodiment, an "inverse push" operation may define a relationship between a subtree (e.g., a subtree of a parent full tree) and the child tree of the subtree (as illustrated in FIG. 13). Here, such an inverse push operation may define a relationship between natural numerals associated with such subtrees and natural numerals associated with respective child trees of such subtrees. Operating on such a natural numeral associated with a subtree (according to an association of trees with natural numerals as illustrated with reference to FIG. 4, for example), an inverse push operation may provide a natural numeral associated with a child tree portion. In a particular embodiment, an inverse push operation may provide as a result as (1) a natural numeral representing a child tree ("Child") and an edge label value linking the child tree with the root node of the parent full tree ("j"). For example, an inverse push operation on a tree may be represented in relation (3) as follows:

$$\text{push}^{-1}(r,k,ST) = <\text{Child}, j>$$

$$\text{Child} = \text{Int}[(P^{-1}(ST)+k-(2-r))/k]; \text{ and}$$

$$j = [P^{-1}(ST)+k-(2-r)]\text{modulo}[k] \quad (3)$$

where:
- $P^{-1}(h)$=an inverse of the Kleene enumeration function for generating a sequence of non-composite numbers illustrated with reference to FIG. 5;
- ST=value of, or natural numeral associated with, subtree with edge label value
- Child=natural numeral representing child tree of subtree represented by ST;
- j=edge label value linking the child tree with the root node of parent full tree;
- k=total number of possible edge label index values linking the child tree with the root node of parent full tree; and
- r=defined value of tree system root/singleton node (either 0 or 1).

It should also be understood that the inverse push operation of relation (3) is merely an example of an inverse push operation used to determine a natural numeral associated with a child tree based, at least in part on a natural numeral associated with a parent subtree, and that the claimed subject matter is not limited in this respect. For example, for simplicity relation (3) assumes that information of a computed index value "j" associating the root node of the parent full tree and the child tree may be derived from edge label values in the absence of node label values (e.g., as in the case of a BELT). However, relation (3) may be expanded to apply to other non-BELT trees. Applied to the tree of FIG. 13, for example, the inverse push operation of relation (3) may be expanded to yield a natural numeral representing the child tree as the value "x" and the label index value j (being a function of edge and node label values "e" and "n").

In the particular embodiment of an inverse push operation illustrated in relation (3), the inverse Kleene enumeration function, $P^{-1}(h)$, provides a result based upon ST (value of, or natural numeral associated with the subtree). Since the Kleene enumeration function generates non-composite natural numerals, the domain of $P^{-1}(h)$ may be limited to non-composite natural numerals. In connection with the association of natural numerals and trees illustrated with reference to FIG. 4, accordingly, the inverse push operation of relation (3) may be applied to natural numerals representing trees having a root node coupled to a single node (or having a single subtree). In one particular implementation of the inverse of the Kleene enumeration function, $P^{-1}(h)$, a look-up table may associate values of h and $P^{-1}(h)$ as shown in Table 1 as follows:

TABLE 1

| h  | $P^{-1}(h)$ |
|----|-------------|
| 2  | 1           |
| 3  | 2           |
| 5  | 3           |
| 7  | 4           |
| 11 | 5           |
| 13 | 6           |
| 17 | 7           |
| 19 | 8           |
| 23 | 9           |
| 29 | 10          |
| 31 | 11          |
| 37 | 12          |
| 41 | 13          |
| 43 | 14          |
| 47 | 15          |
| 53 | 16          |
| 59 | 17          |
| 61 | 18          |
| 67 | 19          |
| 71 | 20          |
| 73 | 21          |
| 79 | 22          |
| 83 | 23          |

To enumerate at least some of the RPSTs of a full tree having two or more subtrees, it may be useful to determine combinations of RPSTs enumerated from the different subtrees. In the case of a full tree comprising two subtrees, in a particular example, individual elements of a first set of RPSTs of the full tree derived from a first subtree (denoted as "X" for the purposes of illustration) may be combined or merged with individual elements of a second set of RSPTs of the tree derived from a second subtree (denoted as "Y" for the purposes of illustration). Here, the elements of X and Y may represent individually enumerated RPSTs of the tree derived from the first and second subtrees, respectively. In a particular embodiment, the elements of X and Y may be represented as natural numerals associated with enumerated RPSTs derived from the respective first and second subtrees (according to an association of trees and natural numerals as illustrated in FIG. 4, for example). Accordingly, a merger of an RPST represented by an element in X with an RPST represented by an element in Y at the root node of the tree may represented by a multiplication of these natural numerals resulting in a natural numeral representing the RPST resulting from the merger.

Figure 16:
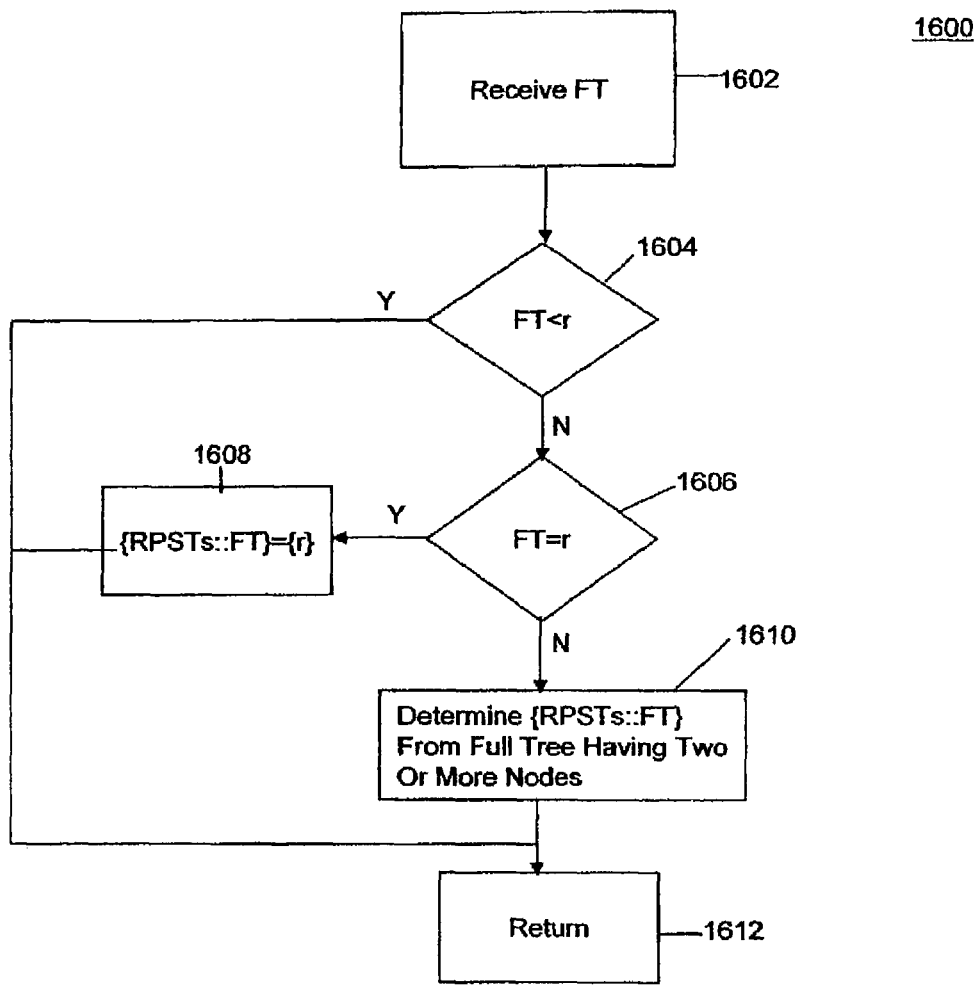
FIGS. 16, 17 and 18 are flow diagrams illustrating a process to enumerate RPSTs from a tree according to an embodiment.
Figure 17:
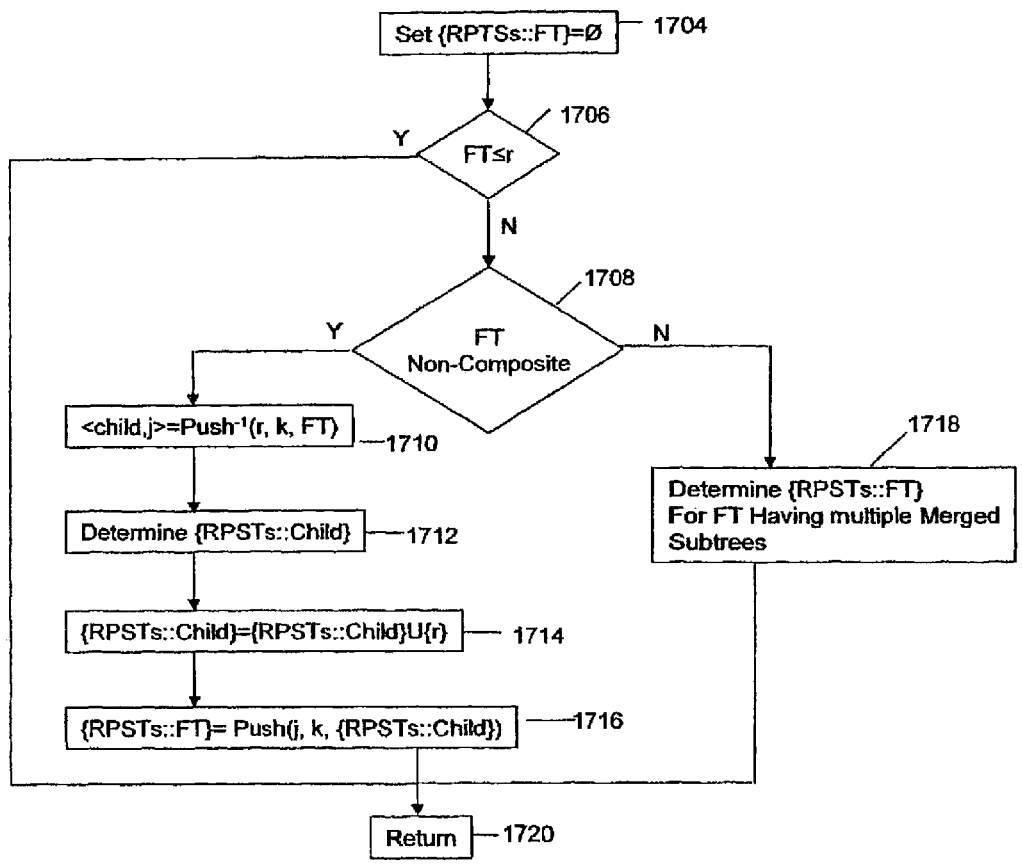
Figure 18:
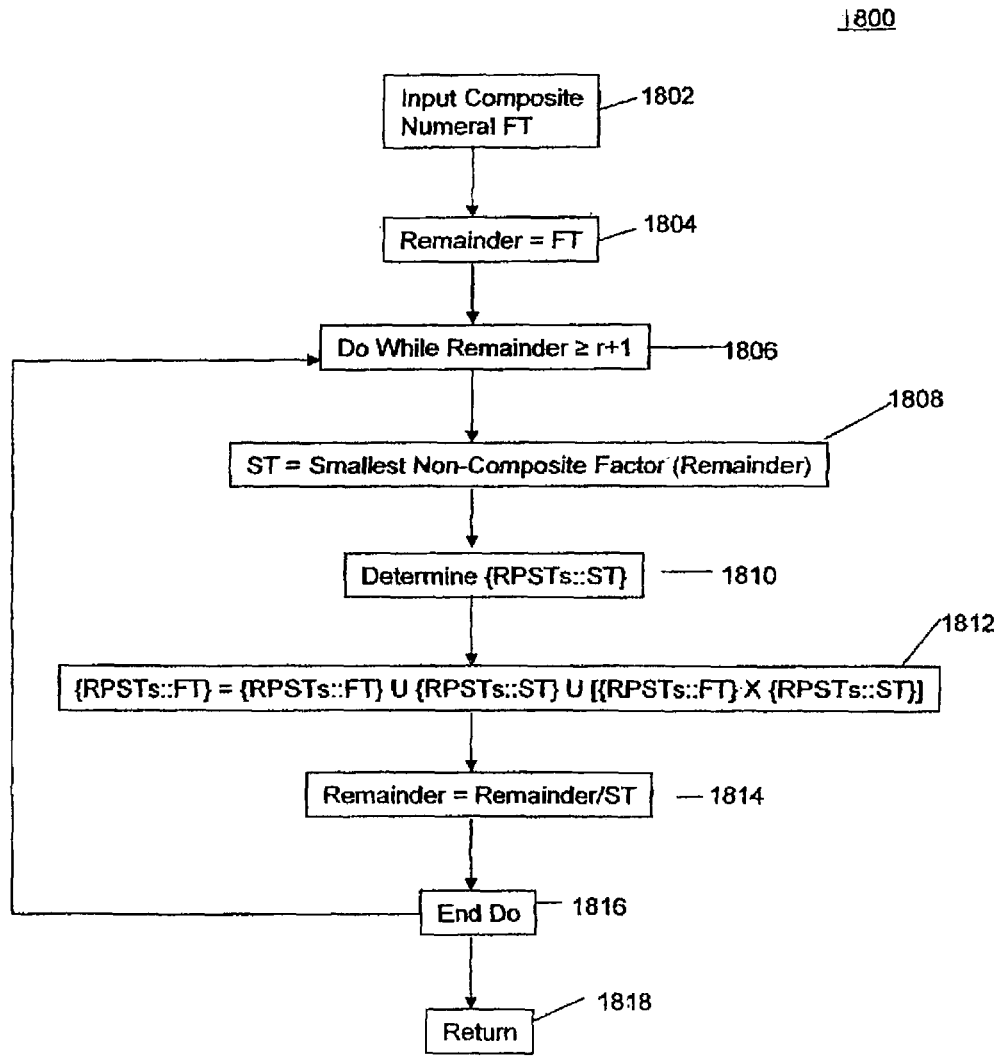

According to one embodiment, a merger operation discussed above (e.g., for combining trees at their root nodes to provide a graphical and numerical expression of the resulting merged trees) may be expanded to create a set merger operation to include a merger among RPSTs (e.g., derived from different subtrees as illustrated above). Here, a member RPST of a first set merges with a member RPST of a second set to provide a member of a third, merged set containing the merged RPSTs as elements, for all members of both first and second sets. Regarding the aforementioned representation of the RPSTs as natural numerals, the set merger operation to merge sets X and Y may be expressed as follows:

$$X \times Y = \{x_1, x_2, x_3, \ldots, x_n\} \times \{y_1, y_2, y_3, \ldots, y_m\} = \quad (4)$$

$$= \{x_1 * y_1, x_1 * y_2, x_1 * y_3, \ldots, x_1 * y_m\} \cup$$

$$\{x_2 * y_1, x_2 * y_2, x_2 * y_3, \ldots, x_1 * y_m\} \cup$$

$$\{x_3 * y_2, x_3 * y_2, x_3 * y_3, \ldots, x_3 * y_m\} \cup \ldots \cup$$

$$\{x_n * y_1, x_n * y_2, x_n * y_3, \ldots, y_n * y_m\}$$

where:
$x_1, x_2, x_3, \ldots x_n$ are the natural numerals representing RPSTs in set X; and
$y_1, y_2, y_3, \ldots y_m$ are the natural numerals representing RPSTs in set Y;

FIGS. 16, 17 and 18 are flow diagrams illustrating a process to enumerate RPSTs from a full tree which applies the aforementioned push operations, inverse push operation and set merger operation of relations (1) through (4) according to a particular embodiment. FIG. 16 illustrates a process 1600 to receive a natural numeral representing a full tree, FT, at block 1602. Diamond 1604 may determine whether the tree represented by FT comprises an empty tree. In this particular embodiment, the value "r" is zero or one depending on whether a single node tree is associated with a value of zero or one (e.g., depending on a particular association embodiment defined above in connection with the push operation of relation (1)). Here, diamond 1604 determines whether the tree represented by FT is an empty tree based upon whether FT is less than r. However, this is merely an example of a technique to identify an empty tree and the claimed subject matter is not limited in this respect. Process 1600 terminates at block 1612 if diamond 1604 determines that FT represents an empty tree. Diamond 1606 determines whether FT represents a single node tree based upon whether FT equals r. However, this is merely an example of a technique to identify a single node tree and the claimed subject matter is not limited in this respect. If FT comprises a single node tree, block 1608 assigns r as the RPST element of {RPSTs::FT} and the process 1600 terminates at block 1612.

Diamond 1606 determines whether FT comprises two or more nodes by determining whether FT is greater than r. If so, block 1610 may initiate execution of process 1700 shown in FIG. 17. Block 1704 initializes the set {RPSTs::FT} to contain no elements while execution of the remaining portions of process 1700 may subsequently add elements to this set. As discussed below, process 1700 may be recursively executed to determine, for example, RPSTs of subtrees of the full tree represented by FT. Accordingly, diamond 1706 determines, much like diamond 1606 of process 1600, whether FT (e.g., in a recursive execution) represents a single node tree. If so, then process 1700 (and process 1600) terminate at block 1720.

If FT is greater than r, diamond 1708 determines whether FT represents a tree comprising a single subtree (e.g. comprising a child tree pushed from the full tree node by an edge as shown in FIG. 13) or a tree comprising a root node that merges two or more subtrees (e.g., as shown in FIG. 8). Here, diamond 1708 determines that FT represents a tree comprising a single subtree if FT comprises a norm-composite numeral, and determines that FT represents a tree having a root node merging two or more subtrees if FT comprises a composite numeral. For this embodiment, an association between trees and natural numerals ay associate composite natural numerals with trees merging two or more subtrees at a root node, and may associate non-composite numerals with trees comprising a single subtree (here, a pushed child tree coupled to the root node of the tree by an edge). However, this is merely an example of an association embodiment, and the claimed subject matter is not limited in this respect.

Similar to the process 1250 illustrated above with reference to FIG. 12, process 1700 employs a process to enumerate the RPSTs of a full tree based, at least in part, on the configuration of the full tree. Here, it should be observed that block 1710 through 1716 collectively represent a process of enumerating RPSTs of a full tree having a single subtree. Process 1700 may employ a different process at block 1718 if the full tree comprises two or more subtrees merged at a root node. As illustrated below, the RPSTs of a full tree may be determined, at least in part, by an enumeration of RPSTs of child trees of subtrees. Accordingly, the process 1700 of enumerating RPSTs of a full tree may include recursively executed for determining such RPSTs of the child trees.

If diamond 1708 determines that FT represents a tree comprising a single subtree, block 1710 executes an inverse push operation on FT as illustrated above in relation (3) to determine a natural numeral "child" representing the child tree coupled to the root node of the tree represented by FT (and edge label value "j" linking the root node with the child tree). At least some of the RPSTs of the tree represented by FT may be derived from RPSTs of the child tree determined at block 1710. Accordingly, block 1712 may recursively execute process 1700 to enumerate the RPSTs of the child tree ({RPSTs::child}). Here, the recursively executed process may apply the natural numeral "child" representing the child tree (e.g., as determined at block 1710) as the FT input value. Block 1714 then combines the single node tree represented by "r" with the set of enumerated RPSTs determined at block 1712. Block 1716 then performs a push operation according to relation (2) on the elements of this combined set {RPSTs::child} to complete the enumeration of the elements of {RPSTs::FT} in a pushed set with the edge label value "j" determined from the inverse push operation at block 1710.

If diamond 1708 determines that FT represents a tree comprising a root node that merges two or more subtrees, block 1718 may enumerate the elements of {RPSTs::FT} by executing a process 1800 shown in FIG. 18. As such, block 1718 may provide the composite numeral FT as an input value to process 1800 at block 1802. Subsequent blocks 1804 through 1818 may then enumerate RPSTs for individual subtrees merged at the root node of the tree represented by FT, and determine {RPSTs::FT} from combinations of the RPSTs enumerated from particular ones of the merged subtrees.

A processing loop of blocks 1806 through 1816 incrementally factors the composite numeral FT into non-composite numerals "ST" representing individual subtrees merged at the root node of the tree represented by FT. Again, this particular embodiment includes an association between trees and natural numerals that associates composite natural numerals with trees merging two or more subtrees at a root node and associates non-composite numerals with trees having a root node coupled to a single pushed subtree; however, the claimed subject matter is not limited in scope to this particular embodiment. Here, block 1804 initializes a "remainder" as FT and block 1808 determines the non-composite numeral ST as the smallest non-composite factor of the remainder. If the remainder is decreased to below r, representing a single node tree in this particular embodiment), sequential execution returns to process 1700 at block 1818.

Through successive executions of the processing loop of blocks 1806 through 1816, block 1808 may sequentially factor the numeral FT into non-composite numerals representing subtrees of the tree represented by FT. According to a particular association embodiment, these non-composite numerals may represent individual ones of subtrees merged at a root node of the tree represented by FT. As at least a portion of the RPSTs of the tree represented by FT may be determined from the RSPTs of these subtrees, block 1810 may recursively execute the process 1700 to enumerate the RPSTs of the subtrees represented by the non-composite values ST determined at block 1808.

It should be observed that the elements of {RPSTs::FT} are derived from the RPSTs enumerated from individual subtrees (determined through loop iterations of block 1810). In addition to these elements, {RPSTs::FT} also includes merged combinations of RPSTs derived from RPSTs enumerated from different subtrees at block 1810 in different loop iterations. Through executions of the loop of block 1806 through 1816, block 1812 updates {RPSTs::FT}. By way of example, for the purpose of illustration, in an initial iteration of the loop, block 1812 may merely assign elements to {RPSTs::FT} (which is initialized as the empty set) to include the RPSTs enumerated at block 1810 from a first subtree of the tree represented by FT. In a second iteration of the loop, block 1810 enumerates RPSTs of a second subtree of the tree represented by FT. In addition to adding the enumerated RPSTs of the second subtree to {RPSTs::FT} (updated in the initial loop iteration to include RPSTs enumerated from the first subtree), block 1812 in the second iteration also updates {RPSTs::FT} to include RPSTs formed from the merger of the current individual elements of {RPSTs::FT} (again, updated from the initial iteration) with individual enumerated RPSTs of the second subtree. Here, block 1812 employs a set merger operation according to relation (4) to determine a merger of the current individual elements of {RPSTs::FT} (e.g., assigning the elements of {RPSTs::FT} to "X") with the individual elements of the enumerated RPSTs of the second subtree (e.g., assigning the elements of RPSTs of the second subtree to "Y"). Subsequent iterations of the processing loop of blocks 1806 through 1816 may then enumerate the RPSTs of additional subtrees, and update {RPSTs::FT} based upon the elements of {RPSTs::FT} updated in the previous iteration and the enumerated RPSTs of the subsequent subtree children in like fashion.

Figure 19:
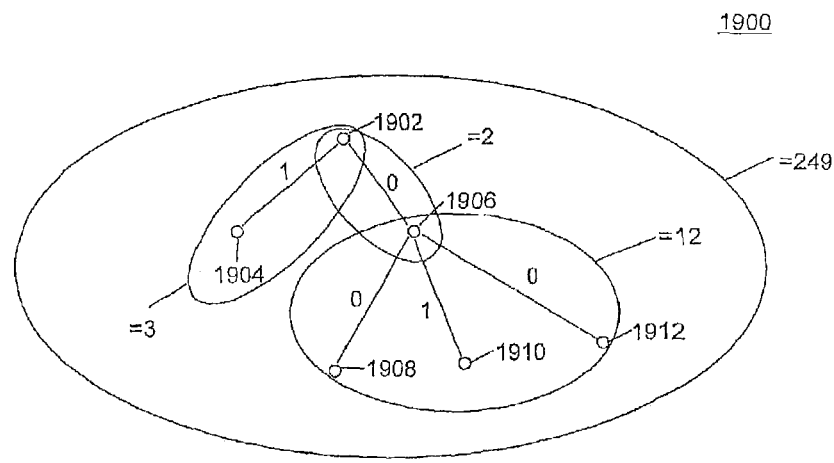
FIGS. 19 through 28 are schematic diagrams illustrating, by way of example, a process to enumerate RPSTs from a tree according to an embodiment.

FIGS. 19 through 28 are schematic diagrams of trees illustrating a specific example of enumerating RPSTs of a tree according to the processes of FIGS. 16, 17 and 18. FIG. 19 shows a tree 1900 which comprises a BELT for this particular illustration of an embodiment, however, it should be understood that the processes described for enumerating RPSTs are applicable to non-BELT trees as well, and that the claimed subject matter is not limited in this respect.

Tree 1900 may be represented as a natural numeral "249" according to an association of trees and natural numerals as described above with reference to FIG. 4, for example. As tree 1900 comprises two or more subtrees merged at a root node 1902, the natural numeral 249 comprises a non-composite natural numeral. Commencing execution of process 1600 for determining {RPSTs::249}, block 1602 defines FT=249. Since tree 1900 comprises a BELT in this particular embodiment, the value of "r" may be "1" consistent with the application of the push operation of relation (1). Accordingly, diamonds 1604 and 1606 direct initiating execution of process 1700 through block 1610.

Block 1704 initializes {RPSTs::249} as an empty set to be subsequently filled with natural numerals representing RPSTs of tree 1900. Since 249 (here, FT) comprises a composite natural numeral, block 1718 may initiate an instance of process 1800. Block 1804 initializes "remainder"=249 and block 1808 determines ST to be the natural numeral 3 (since 249 may be factored into two non-composite numerals 3 and 83).

Block 1810 may initiate a first recursive instance of process 1700 while providing FT=ST=3 as an input value, diamond 1708 determines that 3 is a non-composite numeral. Block 1710 performs an inverse push operation according to relation (3) to determine a natural numeral representative of the child tree of the subtree corresponding to the natural numeral 3 and an edge label value of an edge linking the child tree with the root node as follows:

$$push^{-1}(r=1, k=2, ST=3) = \langle child, j \rangle \qquad (5)$$

$$child = Int[(P^{-1}(3) + 2 - (2-1))/2]$$

$$= Int[(2+2-(2-1))/2]$$

$$= 1$$

$$j = [(P^{-1}(3) + 2 - (2-1))modulo[2]$$

$$= [(2+2-(2-1))]modulo[2]$$

$$= 1$$

Block 1712 initiates execution of a second recursive instance of process 1700, initializing {RPSTs::child}=Ø and terminating at block 1720 through diamond 1706 (since child=1≤r). Returning to block 1714 of the first recursive instance of process 1700, {RPSTs::child} is updated to be {r}={1} for this particular case of a BELT. Block 1716 then performs a push operation on the elements of the set {r} according to relation (2) (applying the edge label value=1 as determined in relation (5) for block 1710) to provide an RPST, {3}, which is graphically illustrated in FIG. 20.

Execution of the initial instance of process 1800 then returns to block 1812 for updating {RPSTs::FT} by including {RPSTs::ST} (={3} as determined above) and merged combinations of the enumerated {RPSTs::ST} with any other previously enumerated RPSTs according to relation (4). Since {RPSTs::FT} at this point comprises an empty set, block 1812 merely updates {RPSTs::FT} to include the single element of {RPSTs::ST}. Block 1814 updates the remainder as FT/ST=249/3=83. This numeral corresponds to a subtree of tree 1900 formed by nodes 1902, 1906, 1908, 1910 and 1912 graphically illustrated as subtree 2100 in FIG. 21.

On a second iteration of the processing loop of blocks 1806 through 1816, block 1808 determines the non-composite factor of the remainder updated at block 1814 of the first iteration of the processing loop. Here, the natural numeral remainder, 83 as determined at block 1814 in the first iteration, comprises a non-composite numeral. Accordingly, block 1808 determines the natural numeral ST of the current iteration to be 83. Block 1810 then determines {RPSTs::83} by initiating a third recursive instance of process 1700. Since 83 is a non-composite natural numeral (as determined at diamond 1708), block 1710 determines the inverse push of 83 according to relation (3) as follows:

$$\text{push}^{-1}(r=1, k=2, ST=83) = \langle \text{child}, j \rangle \quad (6)$$

$$\text{child} = \text{Int}\left[\left(P^{-1}(83)+2-(2-1)\right)/2\right]$$
$$= \text{Int}[(23+2-(2-1))/2]$$
$$= 12$$
$$j = \left[\left(P^{-1}(83)+2-(2-1)\right]\text{modulo}[2]\right.$$
$$= [(23+2-(2-1)]\text{modulo}[2]$$
$$= 0$$

Figure 22:
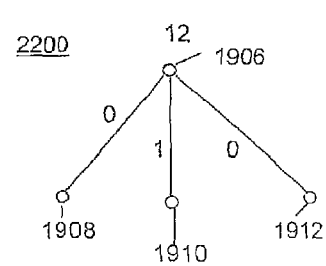

The result of this inverse push operation is graphically illustrated in FIG. 22 which includes a child tree 2200 of the subtree 2100 formed by the nodes 1906, 1908, 1910 and 1912. Block 1712 then determines {RPSTs::12} by initiating a fourth recursive instance of process 1700 (setting FT=child=12). Since the natural numeral "12" is a composite numeral (representing a tree which merges subtrees at a root node), block 1718 may determine {RPSTs::12} by initiating a first recursive instance of process 1800. As block 1804 sets remainder="12", block 1808 determines ST (the natural numeral representing a first merged subtree) as "2." Block 1810 may then determine {RPSTs::2} by initiating a fifth recursive instance of process 1700. Here, since 2 is a non-composite numeral (as determined at diamond 1708), block 1710 may determine the inverse push of "2" according to relation (3) as follows:

$$\text{push}^{-1}(r=1, k=2, ST=2) = \langle \text{child}, j \rangle \quad (7)$$

$$\text{child} = \text{Int}\left[\left(P^{-1}(2)+2-(2-1)\right)/2\right]$$
$$= \text{Int}[(1+2-(2-1))/2]$$
$$= 1$$
$$j = \left[\left(P^{-1}(2)+2-(2-1)\right]\text{modulo}[2]\right.$$
$$= [(1+2-(2-1)]\text{modulo}[2]$$
$$= 0$$

Block 1712 may initiate a sixth recursive instance of process 1700 to determine {RPSTs::1}. Diamond 1706 of the sixth recursive instance of process 1700 may terminate and return {RPSTs::1}=∅ (i.e., the empty set). Returning to the fifth recursive instance of process 1700, block 1714 updates {RPSTs::child} to include {r} ({r}={1} for this particular case where tree 1200 is a BELT). Accordingly, {RPSTs::2}=push {1}={2} (using the edge label value)=0 as determined at block 1710 of the fifth recursive instance of process 1700 and shown in relation (7)). This corresponds with the RPST 2300 of child tree 2200 formed by node 1906, and either node 1908 or 1912 as shown in FIG. 23.

Returning to block 1812 of the first recursive instance of process 1800, {RPSTs::12} is updated as {2}. The remainder is updated to be the natural numeral remainder/ST 12/2=6. Block 1808 determines ST to be the smallest non-composite factor of the updated remainder (here, "6") to be "2." As illustrated above in the fifth recursive instance of process 1700, block 1810 determines {RPSTs::2} to be {2} (again, corresponding with the RPST of subtree 2200 formed by node 1906, and either node 1908 or 1912). Block 1812 may then determine combinations of the previously enumerated elements of {RPSTs::12} with the elements of {RPSTs::ST} using the set merger operation of relation (4) and update {RPSTs::12} as follows:

$$\{RPSTs::12\} = \{RPSTs::12\} \cup \{RPSTs::2\} \cup [\{RPSTs::12\} \times \{RPSTs::2\}] \quad (8)$$
$$= \{RPSTs::2\} \cup \{RPSTs::2\} \cup [\{RPSTs::2\} \times \{RPSTs::2\}]$$
$$= \{2\} \cup \{2\} \cup [\{2\} \times \{2\}]$$
$$= \{2, 4\}$$

Figure 23:
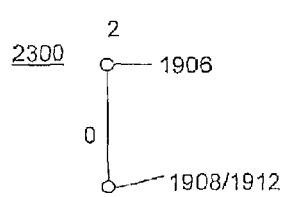
Figure 24:
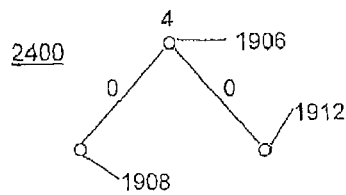
Figure 25:
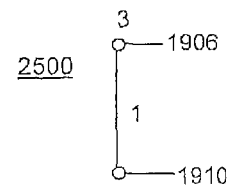

This updated {RPSTs::12} is graphically illustrated in FIGS. 23 (illustrating the RPST 2300 of child tree 2200) and 24 (illustrating an RPST 2400 of subtree 2200 associated with the natural numeral 4).

Block 1814 then updates the remainder=remainder/ST=6/2=3, and the next iteration of the processing loop of blocks 1806 through 1816 determines ST as "3" at block 1808. Block 1810 may determine {RPSTs::ST}={RPSTs::=3}={3} as illustrated above in the first recursive instance of process 1700. This resulting RSPT of the child tree 2200 includes nodes 1906 and 1910 as shown in RPST 2500 of FIG. 25. Block 1812 then updates {RPSTs::12} (from {RPSTs::12}={2, 4} at relation (8) as follows:

$$\{RPSTs::12\} = \{2, 4\} \cup \{3\} \cup [\{2, 4\} \times \{3\}] \quad (9)$$
$$= \{2, 3, 4\} \cup \{6, 12\}$$
$$= \{2, 3, 4, 6, 12\}$$

Figure 26:
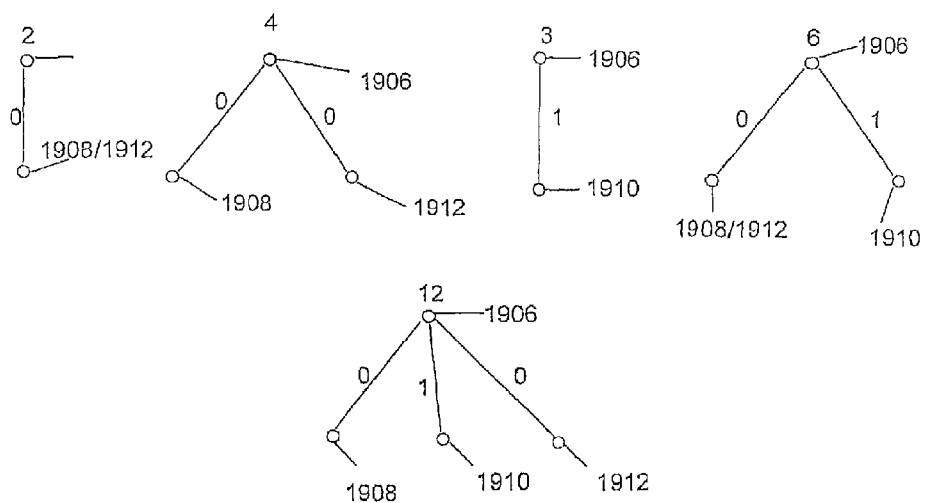

The resulting elements of {RPSTs::12} are graphically illustrated in FIG. 26 with corresponding nodes 1906, 1908, 1910 and 1912 of the child tree 2200 shown in FIG. 22. It should be noted that in the process of enumerating of elements of the set {RPSTs::12} at relations (8) and (9), duplicate RPSTs were enumerated for the RPST corresponding with numeral "4." Here, in listing the elements of the set {RPSTs::12} at relations (8) and (9) in this particular embodiment such a duplicate listing the RPST corresponding with the numeral "4" was not included so as to provide unique, unordered elements of the set {RPSTs::12}. However, this is merely a particular embodiment provided for illustration and the claimed subject matter is not limited in this respect. For example, it should be readily appreciated that the process of enumerating RPSTs of a tree or subtree described herein may be readily applied alternative embodiments for enumerating RPSTs of a tree or subtree that includes such duplicated RPSTs. Again, this example of enumerating duplicate RPSTs is also merely an example provided for the purpose of illustration and the claimed subject matter is not limited in this respect.

Returning to the third recursive instance of process 1700 (following the identification of 2200 as the child tree of RPST 2100 at block 1710 and the enumeration of the RPSTs of subtree 2200 as the elements of {RPSTs::12} in block 1712}), block 1714 updates {RPSTs::child} to include {RPSTs::12} U {r}={1, 2, 3, 4, 6, 12}. Block 1716 may then complete the enumeration of the elements of {RPSTs::83} by performing a push operation on the elements of {RPSTs::child} according to relation (2) (with label index value j=0 as determined in relation (6)) as follows:

{RPSTs::83}=zero-push({1,2,3,4,0,12})={2,5,11,17, 31,83} (10)

Figure 21:
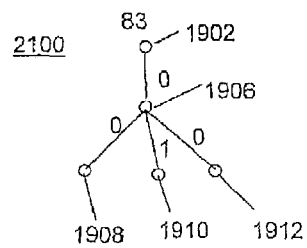
Figure 27:
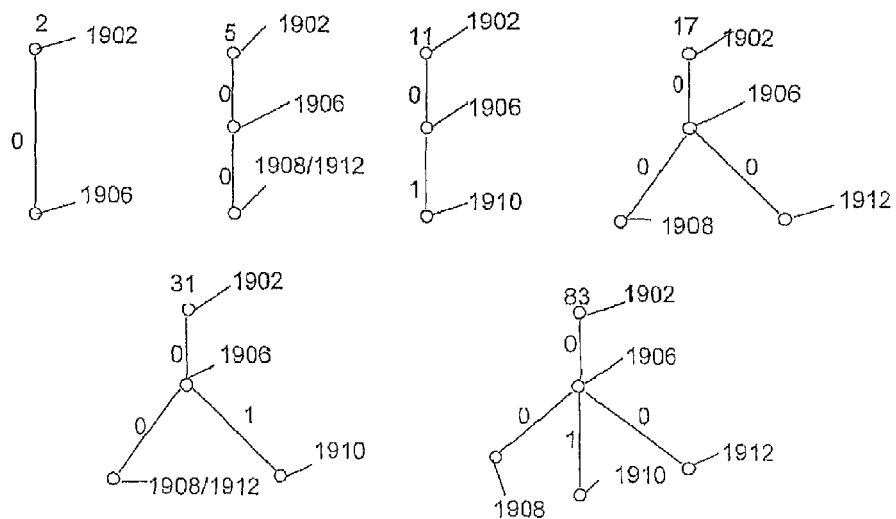
Figure 28:
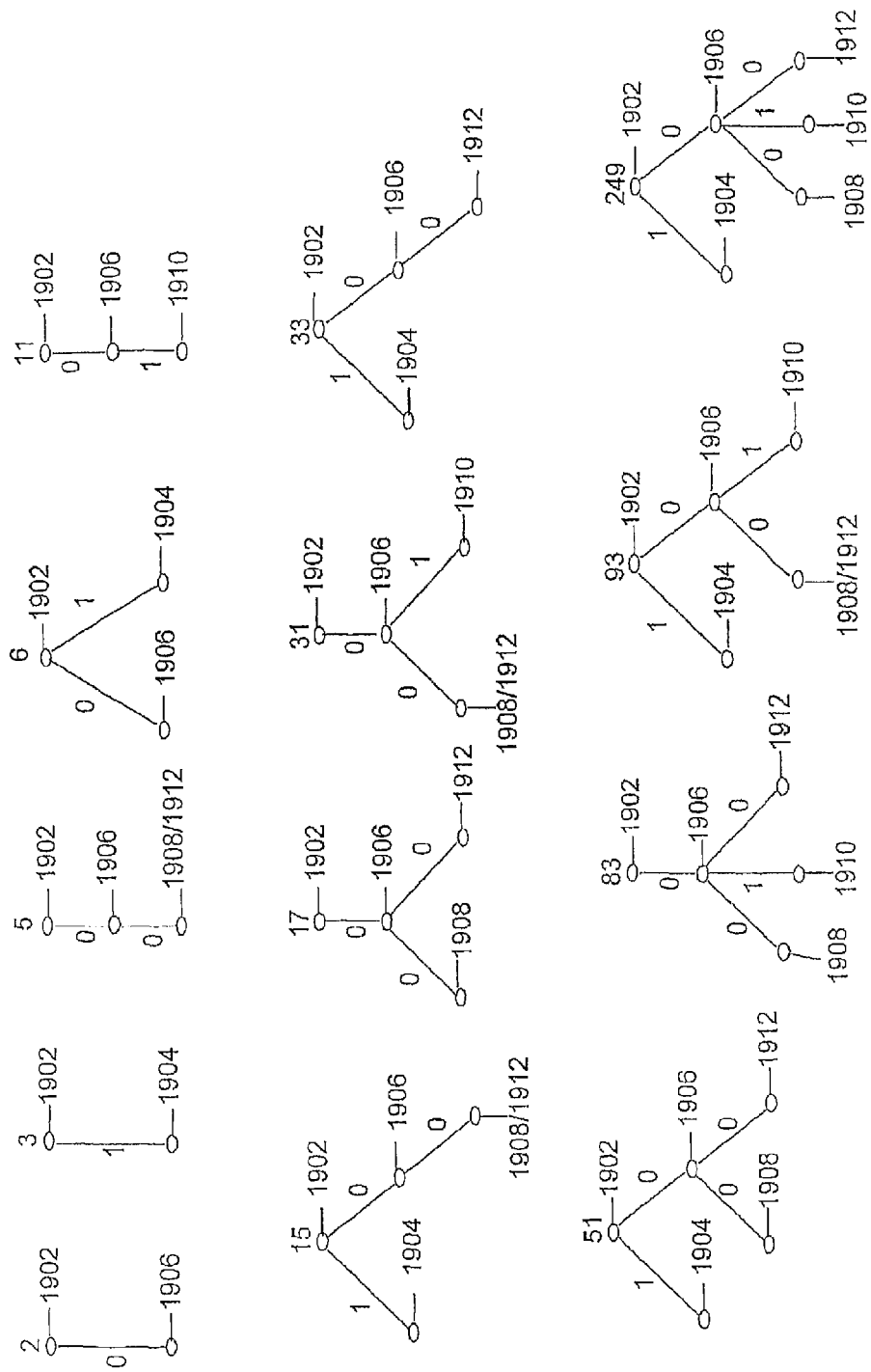

The resulting elements of {RPSTs::83} are graphically illustrated with reference to FIG. 27 with corresponding nodes 1902, 1906, 1908, 1910 and 1912 of the subtree 2100 shown in FIG. 21.

Figure 20:
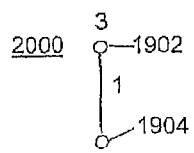

Returning to the initial instance of process 1800 (following the enumeration of elements in {RPSTs::3} corresponding with a first subtree merged at root node 1902 as graphically illustrated in FIG. 20 and the enumeration of elements in {RPSTs::83} corresponding with a second subtree merged at root node 1902 as graphically illustrated in FIG. 27), block 1812 updates {RPSTs::FT} as follows:

$$\{RPSTs::FT\} = \{RPSTs::3\} \cup \{RPSTs::83\} \cup [\{RPSTs::3\} \times \{RPSTs::83\}]$$
$$= \{2, 3, 5, 11, 17, 31, 83\} \cup [\{3\} \times \{2, 5, 11, 17, 31, 83\}]$$
$$= \{2, 3, 5, 11, 17, 31, 83\} \cup \{6, 15, 33, 51, 93, 249\}$$
$$= \{2, 3, 5, 6, 11, 15, 17, 31, 33, 51, 83, 93, 249\}$$

(11)

While the above illustrated example is a specific case of enumerating RPSTs from one particular BELT (associated with the natural numeral 249), it should be understood that the processes are general enough to enumerate RPSTs for any tree. Also, while the illustrated example is specifically directed to enumerating RPSTS of a BELT, the claimed subject matter is not limited to this specific example or specifically to BELTs.

According to an embodiment, the technique described above may have many applications in the management and/or manipulation of hierarchical data. The ability to enumerate possible RPSTs from a tree may be applied to any one of several database management applications. In one example, a complicated tree matching process may be simplified to a more computationally efficient set inclusion process. In a particular example, processing a query to an extensible markup language (XML) document or set of documents may be simplified to a set inclusion process. Here, the XML document or set of documents may be represented as a tree associated with a natural numeral. The RPSTs of the tree may then be enumerated to model possible logical branches of the query through the XML document or set of documents, and enumerated RPSTs are associated with natural numerals in a set of natural numerals representing the possible logical branches. A natural numeral representing the query may then be compared with the elements in the set representing the possible logical branches to determine one or more matches. The query may then be "answered" using the RPSTs associated with the matched elements.

In another particular example applied to biometric pattern recognition, a known biometric pattern (e.g., facial features) may be modeled as a tree associated with a natural numeral. The RPSTs of the tree may then be enumerated to model possible features or combinations of features of the biometric pattern, and the enumerated RPSTs may be associated with natural numerals in a set of natural numerals representing features of the biometric pattern. A natural numeral representing one or more detected features of a subject or specimen may be compared to the elements of the set to determine one or more matches. A positive identification of the subject or specimen may then be determined based, at least in part, upon the one or more matches.

It should be understood that the above described applications of the process for enumerating RPSTs of a tree are merely example applications and that the claimed subject matter is not limited to such example applications.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method, comprising:
representing content, at least in part, as a data representation corresponding to a set of partial subtrees, wherein the set of partial subtrees comprises at least a first partial subtree having a same node as a second partial subtree;

representing a query as a numeral;
comparing the numeral with one or more numerals;
enumerating the set of partial subtrees, wherein the one or more numerals represent the enumerated set of partial subtrees; and
returning at least one or more corresponding partial subtrees of the enumerated set of partial subtrees based, at least in part, on the comparing.

2. The method of claim 1, wherein the data representation corresponds to a complex tree hierarchy.

3. The method of claim 1, wherein the data representation is a multi-dimensional data representation.

4. The method of claim 1, wherein the data representation comprises:
an edge labeled tree or a node labeled tree.

5. The method of claim 1, wherein the at least one or more corresponding partial subtrees of the enumerated set of partial subtrees are returned in response to the query.

6. The method of claim 1, wherein the data representation is represented, at least in part, via a hierarchical set of stored states, and wherein the set of partial subtrees represent at least a portion of the hierarchical set of stored states in the data representation.

7. The method of claim 1, wherein the enumerated set of partial subtrees of the data representation comprises at least one of:
an empty tree;
a single node tree;
a tree comprising a subtree coupled to a root node of the data representation by an edge; or
two or more trees coupled to a root node of the data representation by respective edges.

8. The method of claim 1, wherein the data representation comprises a hierarchical structure.

9. The method of claim 1, wherein the numeral comprises at least one of a binary, integer, natural numeral, and whole numeral.

10. The method of claim 1, wherein the one or more numerals respectively comprise at least one of a binary, integer, natural numeral, and whole numeral.

11. The method of claim 1, wherein the numeral represents a data type.

12. The method of claim 1, wherein the one or more numerals respectively represent at least one data type.

13. The method of claim 1, wherein the one or more numerals representing the enumerated set of partial subtrees comprise the one or more numerals being associated with at least one tree structure of the enumerated set of partial subtrees.

14. The method of claim 1, wherein the one or more numerals representing the enumerated set of partial subtrees comprise the one or more numerals being associated with at least one node of the enumerated set of partial subtrees.

15. The method of claim 1, wherein the one or more numerals representing the enumerated set of partial subtrees comprise the one or more numerals being associated with at least one edge of the enumerated set of partial subtrees.

16. The method of claim 1, wherein the enumerated set of partial subtrees comprise the content or a portion thereof, and wherein the one or more numerals representing the enumerated set of partial subtrees comprise the one or more numerals representing the content or a portion thereof.

17. The method of claim 1, wherein enumerating the set of partial subtrees comprises listing the set of partial subtrees in an order.

18. The method of claim 1, wherein enumerating the set of partial subtrees comprises representing the set of partial subtrees as a set containing a collection of elements.

19. The method of claim 1, wherein enumerating the set of partial subtrees comprises enumerating one or more nodes from the set of partial subtrees.

20. The method of claim 1, wherein the enumerated set of partial subtrees is a result, at least in part, of the comparing the numeral with one or more numerals.

21. The method of claim 1, wherein the returning at least one or more corresponding partial subtrees of the enumerated set of partial subtrees is based, at least in part, on the enumerating.

22. The method of claim 1, wherein the query is in the form of a hierarchically structured tree, and wherein representing the query as the numeral comprises associating the hierarchically structured tree or portion thereof with the numeral.

23. The method of claim 22, wherein associating the hierarchically structured tree or portion thereof with the numeral comprises associating a tree structure of the hierarchically structured tree with the numeral.

24. The method of claim 22, wherein associating the hierarchically structured tree or portion thereof with the numeral comprises associating a query subtree of the hierarchically structured tree with the numeral.

25. The method of claim 22, wherein associating the hierarchically structured tree or portion thereof with the numeral comprises associating at least one node of the hierarchically structured tree with the numeral.

26. The method of claim 22, wherein associating the hierarchically structured tree or portion thereof with the numeral comprises associating at least one edge of the hierarchically structured tree with the numeral.

27. The method of claim 22, wherein the hierarchically structured tree comprises data, and wherein associating the hierarchically structured tree or portion thereof with the numeral comprises associating at least a portion of the data with the numeral.

28. The method of claim 22, wherein the one or more numerals representing the enumerated set of partial subtrees comprise the one or more numerals being associated with at least one tree structure of the enumerated set of partial subtrees.

29. The method of claim 22, wherein the one or more numerals representing the enumerated set of partial subtrees comprise the one or more numerals being associated with at least one node of the enumerated set of partial subtrees.

30. The method of claim 22, wherein the one or more numerals representing the enumerated set of partial subtrees comprise the one or more numerals being associated with at least one edge of the enumerated set of partial subtrees.

31. The method of claim 22, wherein the enumerated set of partial subtrees comprise the content or a portion thereof, and wherein the one or more numerals representing the enumerated set of partial subtrees comprise the one or more numerals representing the content or a portion thereof.

32. The method of claim 22, wherein enumerating the set of partial subtrees comprises listing the set of partial subtrees in an order.

33. The method of claim 22, wherein enumerating the set of partial subtrees comprises representing the set of partial subtrees as a set containing a collection of elements.

34. The method of claim 22, wherein enumerating the set of partial subtrees comprises enumerating one or more nodes from the set of partial subtrees.

35. The method of claim 22, wherein the enumerated set of partial subtrees is a result, at least in part, of the comparing the numeral with one or more numerals.

36. The method of claim 22, wherein the returning at least one or more corresponding partial subtrees of the enumerated set of partial subtrees is based, at least in part, on the enumerating.

37. The method of claim 1, wherein the query is in the form of a query string, and wherein representing the query as the numeral comprises:
converting the query string into a hierarchically structured tree; and
associating the hierarchically structured tree or portion thereof with the numeral.

38. The method of claim 37, wherein associating the hierarchically structured tree or portion thereof with the numeral comprises associating a tree structure of the hierarchically structured tree with the numeral.

39. The method of claim 37, wherein associating the hierarchically structured tree or portion thereof with the numeral comprises associating a query subtree of the hierarchically structured tree with the numeral.

40. The method of claim 37, wherein associating the hierarchically structured tree or portion thereof with the numeral comprises associating at least one node of the hierarchically structured tree with the numeral.

41. The method of claim 37, wherein associating the hierarchically structured tree or portion thereof with the numeral comprises associating at least one edge of the hierarchically structured tree with the numeral.

42. The method of claim 37, wherein the hierarchically structured tree comprises data, and wherein associating the hierarchically structured tree or portion thereof with the numeral comprises associating at least a portion of the data with the numeral.

43. The method of claim 37, wherein the one or more numerals representing the enumerated set of partial subtrees comprise the one or more numerals being associated with at least one tree structure of the enumerated set of partial subtrees.

44. The method of claim 37, wherein the one or more numerals representing the enumerated set of partial subtrees comprise the one or more numerals being associated with at least one node of the enumerated set of partial subtrees.

45. The method of claim 37, wherein the one or more numerals representing the enumerated set of partial subtrees comprise the one or more numerals being associated with at least one edge of the enumerated set of partial subtrees.

46. The method of claim 37, wherein the enumerated set of partial subtrees comprise the content or a portion thereof, and wherein the one or more numerals representing the enumerated set of partial subtrees comprise the one or more numerals representing the content or a portion thereof.

47. The method of claim 37, wherein enumerating the set of partial subtrees comprises listing the set of partial subtrees in an order.

48. The method of claim 37, wherein enumerating the set of partial subtrees comprises representing the set of partial subtrees as a set containing a collection of elements.

49. The method of claim 37, wherein enumerating the set of partial subtrees comprises enumerating one or more nodes from the set of partial subtrees.

50. The method of claim 37, wherein the enumerated set of partial subtrees is a result, at least in part, of the comparing the numeral with one or more numerals.

51. The method of claim 37, wherein the returning at least one or more corresponding partial subtrees of the enumerated set of partial subtrees is based, at least in part, on the enumerating.

52. A method, comprising:
representing content, at least in part, as a data representation corresponding to a set of partial subtrees, wherein the set of partial subtrees comprises at least a first partial subtree having a same node as a second partial subtree;
representing a query in the form of a hierarchically structured tree, wherein the hierarchically structured tree or portion thereof is associated with a numeral;
comparing the numeral with one or more numerals;
enumerating the set of partial subtrees, wherein the one or more numerals are associated with the enumerated set of partial subtrees; and
returning at least one or more corresponding partial subtrees of the enumerated set of partial subtrees.

53. The method of claim 52, wherein the data representation is a complex tree hierarchy.

54. The method of claim 52, wherein the data representation is a multi-dimensional data representation.

55. The method of claim 52, wherein the data representation comprises:
an edge labeled tree or a node labeled tree.

56. The method of claim 52, wherein the data representation comprises a hierarchical structure.

57. The method of claim 52, wherein at least one or more corresponding partial subtrees of the enumerated set of partial subtrees are returned in response to the query.

58. The method of claim 52, wherein the data representation is represented, at least in part, via a hierarchical set of stored states, and wherein the set of partial subtrees represent at least a portion of the hierarchical set of stored states in the data representation.

59. The method of claim 52, wherein the enumerated set of partial subtrees of the data representation comprises at least one of:
an empty tree;
a single node tree;
a tree comprising a subtree coupled to a root node of the data representation by an edge; or
two or more trees coupled to a root node of the data representation by respective edges.

60. The method of claim 52, wherein the numeral comprises at least one of a binary, integer, natural numeral, and whole numeral.

61. The method of claim 52, wherein the one or more numerals respectively comprise at least one of a binary, integer, natural numeral, and whole numeral.

62. The method of claim 52, wherein the numeral represents a data type.

63. The method of claim 52, wherein the one or more numerals respectively represent at least one data type.

64. The method of claim 52, wherein associating the hierarchically structured tree or portion thereof with the numeral comprises associating a tree structure of the hierarchically structured tree with the numeral.

65. The method of claim 52, wherein associating the hierarchically structured tree or portion thereof with the numeral comprises associating a query subtree of the hierarchically structured tree with the numeral.

66. The method of claim 52, wherein associating the hierarchically structured tree or portion thereof with the numeral comprises associating at least one node of the hierarchically structured tree with the numeral.

67. The method of claim 52, wherein associating the hierarchically structured tree or portion thereof with the numeral comprises associating at least one edge of the hierarchically structured tree with the numeral.

68. The method of claim 52, wherein the hierarchically structured tree comprises data, and wherein associating the hierarchically structured tree or portion thereof with the numeral comprises associating at least a portion of the data with the numeral.

69. The method of claim 52, wherein the one or more numerals representing the enumerated set of partial subtrees comprise the one or more numerals being associated with at least one tree structure of the enumerated set of partial subtrees.

70. The method of claim 52, wherein the one or more numerals representing the enumerated set of partial subtrees comprise the one or more numerals being associated with at least one node of the enumerated set of partial subtrees.

71. The method of claim 52, wherein the one or more numerals representing the enumerated set of partial subtrees comprise the one or more numerals being associated with at least one edge of the enumerated set of partial subtrees.

72. The method of claim 52, wherein the enumerated set of partial subtrees comprise the content or a portion thereof, and wherein the one or more numerals representing the enumerated set of partial subtrees comprise the one or more numerals representing the content or a portion thereof.

73. The method of claim 52, wherein enumerating the set of partial subtrees comprises listing the set of partial subtrees in an order.

74. The method of claim 52, wherein enumerating the set of partial subtrees comprises representing the set of partial subtrees as a set containing a collection of elements.

75. The method of claim 52, wherein enumerating the set of partial subtrees comprises enumerating one or more nodes from the set of partial subtrees.

76. The method of claim 52, wherein the enumerated set of partial subtrees is a result, at least in part, of the comparing the numeral with one or more numerals.

77. The method of claim 52, wherein the returning at least one or more corresponding partial subtrees of the enumerated set of partial subtrees is based, at least in part, on the enumerating.

78. A method, comprising:
representing content, at least in part, as a data representation corresponding to a set of partial subtrees, wherein the set of partial subtrees comprises at least a first partial subtree having a same node as a second partial subtree;
representing a query in the form of a hierarchically structured tree, wherein the hierarchically structured tree or portion thereof is associated with a numeral;
comparing the numeral with one or more numerals;
enumerating the set of partial subtrees, wherein the one or more numerals are associated with the enumerated set of partial subtrees; and
returning the enumerated set of partial subtrees.

79. The method of claim 78, wherein the data representation is a complex tree hierarchy.

80. The method of claim 78, wherein the data representation is a multi-dimensional data representation.

81. The method of claim 78, wherein the data representation comprises:
an edge labeled tree or a node labeled tree.

82. The method of claim 78, wherein the data representation comprises a hierarchical structure.

83. The method of claim 78, wherein the enumerated set of partial subtrees are returned in response to the query.

84. The method of claim 78, wherein the data representation is represented, at least in part, via a hierarchical set of stored states, and wherein the set of partial subtrees represent at least a portion of the hierarchical set of stored states in the data representation.

85. The method of claim 78, wherein the enumerated set of partial subtrees of the data representation comprises at least one of:
an empty tree;
a single node tree;
a tree comprising a subtree coupled to a root node of the data representation by an edge; or
two or more trees coupled to a root node of the data representation by respective edges.

86. The method of claim 78, wherein the numeral comprises at least one of a binary, integer, natural numeral, and whole numeral.

87. The method of claim 78, wherein the one or more numerals respectively comprise at least one of a binary, integer, natural numeral, and whole numeral.

88. The method of claim 78, wherein the numeral represents a data type.

89. The method of claim 78, wherein the one or more numerals respectively represent at least one data type.

90. The method of claim 78, wherein associating the hierarchically structured tree or portion thereof with the numeral comprises associating a tree structure of the hierarchically structured tree with the numeral.

91. The method of claim 78, wherein associating the hierarchically structured tree or portion thereof with the numeral comprises associating a query subtree of the hierarchically structured tree with the numeral.

92. The method of claim 78, wherein associating the hierarchically structured tree or portion thereof with the numeral comprises associating at least one node of the hierarchically structured tree with the numeral.

93. The method of claim 78, wherein associating the hierarchically structured tree or portion thereof with the numeral comprises associating at least one edge of the hierarchically structured tree with the numeral.

94. The method of claim 78, wherein the hierarchically structured tree comprises data, and wherein associating the hierarchically structured tree or portion thereof with the numeral comprises associating at least a portion of the data with the numeral.

95. The method of claim 78, wherein the one or more numerals representing the enumerated set of partial subtrees comprise the one or more numerals being associated with at least one tree structure of the enumerated set of partial subtrees.

96. The method of claim 78, wherein the one or more numerals representing the enumerated set of partial subtrees comprise the one or more numerals being associated with at least one node of the enumerated set of partial subtrees.

97. The method of claim 78, wherein the one or more numerals representing the enumerated set of partial subtrees comprise the one or more numerals being associated with at least one edge of the enumerated set of partial subtrees.

98. The method of claim 78, wherein the enumerated set of partial subtrees comprise the content or a portion thereof, and wherein the one or more numerals representing the enumerated set of partial subtrees comprise the one or more numerals representing the content or a portion thereof.

99. The method of claim 78, wherein enumerating the set of partial subtrees comprises listing the set of partial subtrees in an order.

100. The method of claim 78, wherein enumerating the set of partial subtrees comprises representing the set of partial subtrees as a set containing a collection of elements.

101. The method of claim 78, wherein enumerating the set of partial subtrees comprises enumerating one or more nodes from the set of partial subtrees.

102. The method of claim 78, wherein the enumerated set of partial subtrees is a result, at least in part, of the comparing the numeral with one or more numerals.

103. The method of claim 78, wherein the returning at least one or more corresponding partial subtrees of the enumerated set of partial subtrees is based, at least in part, on the enumerating.

\* \* \* \* \*